(12) United States Patent
Tomaru

(10) Patent No.: US 11,580,689 B2
(45) Date of Patent: Feb. 14, 2023

(54) INFORMATION DISPLAY CONTROL DEVICE, METHOD, AND NON-TRANSITORY COMPUTER-READABLE RECORDING MEDIUM

(71) Applicant: MITSUBISHI ELECTRIC CORPORATION, Tokyo (JP)

(72) Inventor: Yoshihiro Tomaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 130 days.

(21) Appl. No.: 17/306,213

(22) Filed: May 3, 2021

(65) Prior Publication Data
US 2021/0256760 A1 Aug. 19, 2021

Related U.S. Application Data

(63) Continuation of application No. PCT/JP2019/000465, filed on Jan. 10, 2019.

(51) Int. Cl.
*G06T 15/20* (2011.01)
(52) U.S. Cl.
CPC .................................... *G06T 15/20* (2013.01)
(58) Field of Classification Search
CPC .............................. G06T 15/20; G06T 15/005
See application file for complete search history.

(56) References Cited

U.S. PATENT DOCUMENTS

| | | |
|---|---|---|
| 2004/0260916 A1 | 12/2004 | Ueda et al. |
| 2015/0331487 A1 | 11/2015 | Roth et al. |
| 2016/0082840 A1 | 3/2016 | Yoshida et al. |
| 2017/0205890 A1 | 7/2017 | Takimoto et al. |
| 2019/0111844 A1 | 4/2019 | Suzuki et al. |

FOREIGN PATENT DOCUMENTS

| | | |
|---|---|---|
| JP | 2003-141557 A | 5/2003 |
| JP | 2015-87619 A | 5/2015 |
| JP | 2016-506572 A | 3/2016 |
| JP | 2016-53767 A | 4/2016 |
| WO | WO 2015/037117 A1 | 3/2015 |
| WO | WO 2017/168953 A1 | 10/2017 |

*Primary Examiner* — Michelle Chin
(74) *Attorney, Agent, or Firm* — Birch, Stewart, Kolasch & Birch, LLP

(57) ABSTRACT

An information display control device displays, in a display region, an image of a virtual object for indicating a position of an object. The device includes: a determiner to determine a size of the virtual object based on the position of the object; a drawer to generate an image of the virtual object by placing the virtual object at the position of the object and performing a perspective projection of the virtual object onto a virtual region with a viewpoint of a user as a reference; a generator to generate a table representing a relationship between grid points in the virtual region and points corresponding to the grid points in a plane including the display region; a transformer to generate a display image of the virtual object by transforming the image of the virtual object using the table; and a controller to display the display image in the display region.

14 Claims, 19 Drawing Sheets

FIG. 11A
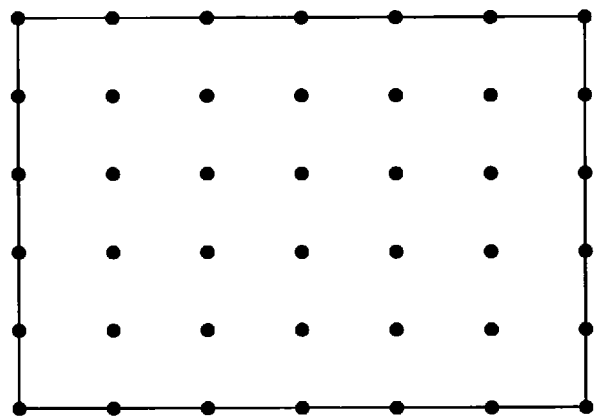
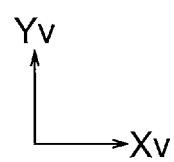
FIG. 11B
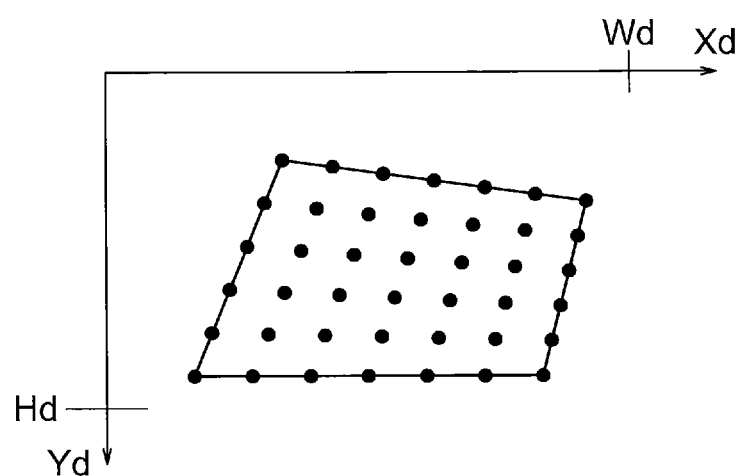

FIG. 12

| (Xv, Yv, Zv)    | (Xd, Yd)    |
|-----------------|-------------|
| (Xv1, Yv1, Zv1) | (Xd1, Yd1)  |
| (Xv2, Yv2, Zv2) | (Xd2, Yd2)  |
| ⋮               | ⋮           |
| (Xvn, Yvn, Zvn) | (Xdn, Ydn)  |
| ⋮               | ⋮           |

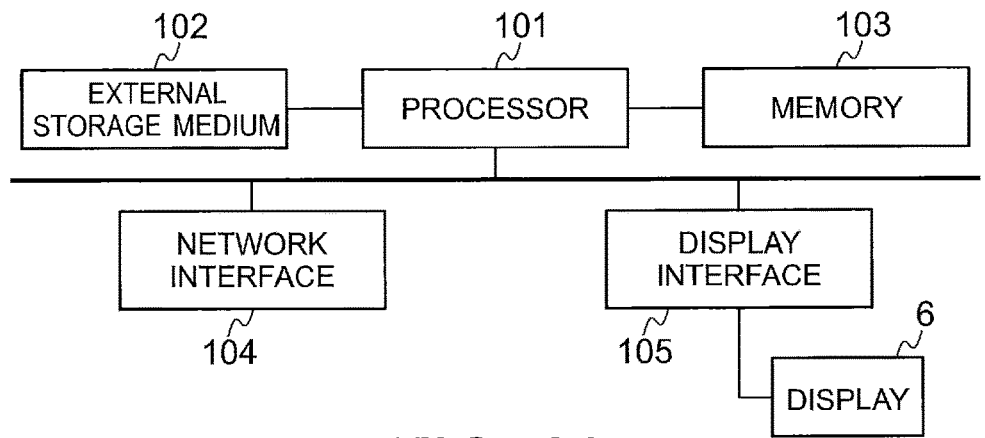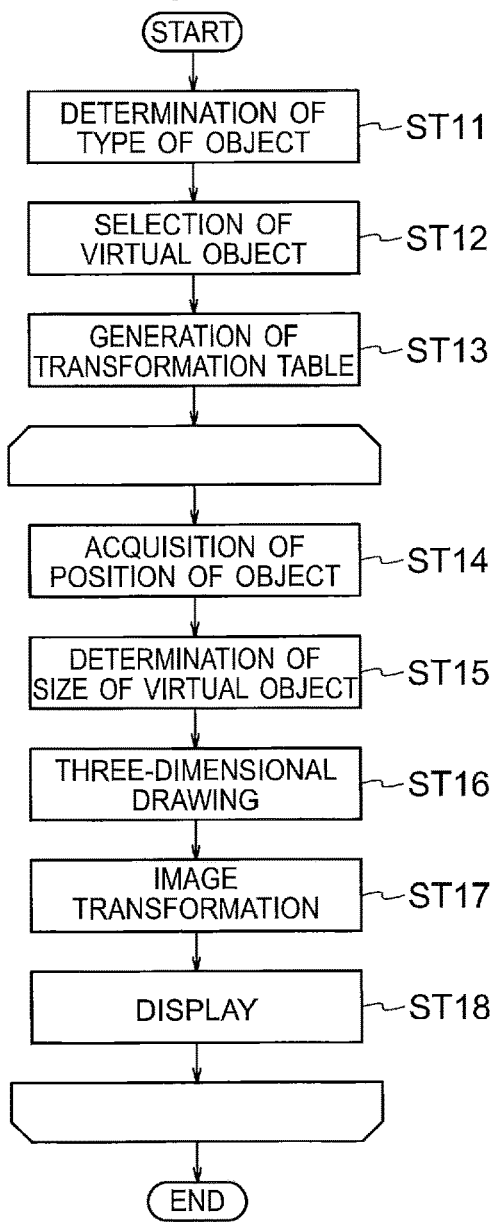

INFORMATION DISPLAY CONTROL DEVICE, METHOD, AND NON-TRANSITORY COMPUTER-READABLE RECORDING MEDIUM

CROSS REFERENCE TO RELATED APPLICATION

This application is a continuation of International Application No. PCT/JP2019/000465, filed on Jan. 10, 2019, the disclosure of which is incorporated herein by reference in its entirety.

BACKGROUND OF THE INVENTION

1. Field of the Invention

The present invention relates to an information display control device, a method, and a non-transitory computer-readable recording medium.

2. Description of the Related Art

As a conventional information display device, there is known a device that, when a pointing manipulation to the outside of a display region is performed, displays a cursor in the display region. The device changes the size, color, shape, pattern, or the like of the cursor according to the distance from the display region to the pointing position (see, e.g., Patent Literature 1).

Patent Literature 1: Japanese Patent Application Publication No. 2016-53767 (see paragraphs 0028 to 0033)

The conventional device has a problem in that although it is possible to perceive the change in the position, it is not possible to intuitively perceive the position itself.

SUMMARY OF THE INVENTION

The present invention has been made to solve the above problem, and is intended to allow a user to intuitively perceive a position outside a display region.

An information display control device of the present invention is an information display control device to display, in a display region, an image of a virtual object for indicating a position of an object, the information display control device including: a size determiner to determine a size of the virtual object on a basis of the position of the object; a three-dimensional drawer to generate an image of the virtual object by placing the virtual object whose size has been determined, at the position of the object, and performing a perspective projection of the virtual object onto a virtual region with a viewpoint of a user as a reference; a transformation table generator to generate a transformation table representing a relationship between a plurality of grid points in the virtual region and points corresponding to the plurality of grid points in a plane including the display region; an image transformer to generate a display image of the virtual object by transforming the image of the virtual object by using the transformation table; and a display controller to display the display image in the display region, wherein the virtual object is a three-dimensional figure such that a whole of the three-dimensional figure can be perceived from part of the three-dimensional figure by amodal completion.

The present invention allows a user to intuitively perceive the position of an object outside a display region.

BRIEF DESCRIPTION OF DRAWINGS

FIG. 11A is a diagram illustrating multiple grid points on the virtual region, and FIG. 11B is a diagram illustrating points corresponding to the grid points on the display region surface.

FIG. 12 is a diagram illustrating an example of a transformation table.

FIG. 22 is a functional block diagram illustrating a computer including one processor that implements functions of the information display control device of the first, second, or third embodiment.

FIG. 23 is a flowchart illustrating a procedure of a process in a case of causing the processor to execute a process of the information display control device of the first embodiment.

DETAILED DESCRIPTION OF THE INVENTION

Although information display control devices according to the present invention can be used for various purposes, the following description describes, as examples, ones used as part of driving assistance devices.

First Embodiment

Figure 1:
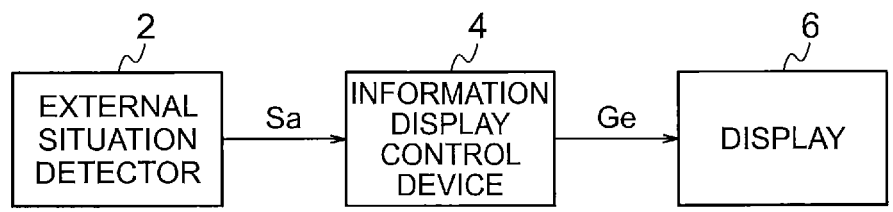
FIG. 1 is a functional block diagram illustrating a driving assistance device including an information display control device of a first embodiment of the present invention.

FIG. 1 illustrates a driving assistance device 1 including an information display control device 4 of a first embodiment of the present invention.

Figure 2:
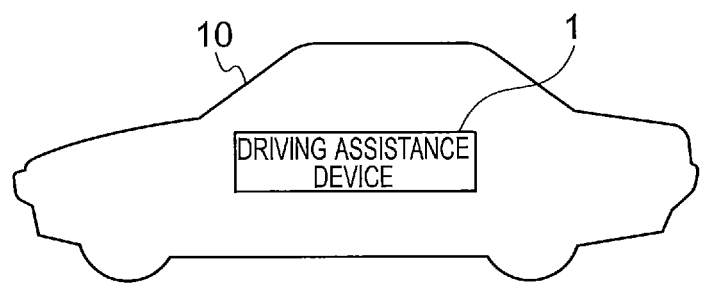
FIG. 2 is a schematic diagram illustrating a vehicle provided with the driving assistance device.

The illustrated driving assistance device 1 is mounted on a vehicle 10, for example, as illustrated in FIG. 2, and includes an external situation detector 2 and a display 6 in addition to the information display control device 4.

The external situation detector 2 detects a situation outside the vehicle and outputs detection information Sa regarding one or more objects located around the vehicle.

The objects described here are objects (attention objects) to be attended to in driving of the vehicle, and include other vehicles, pedestrians, and fixed structures. The other vehicles include four-wheel automobiles (such as passenger vehicles, trucks, or buses), two-wheel automobiles, and bicycles.

Figure 3:
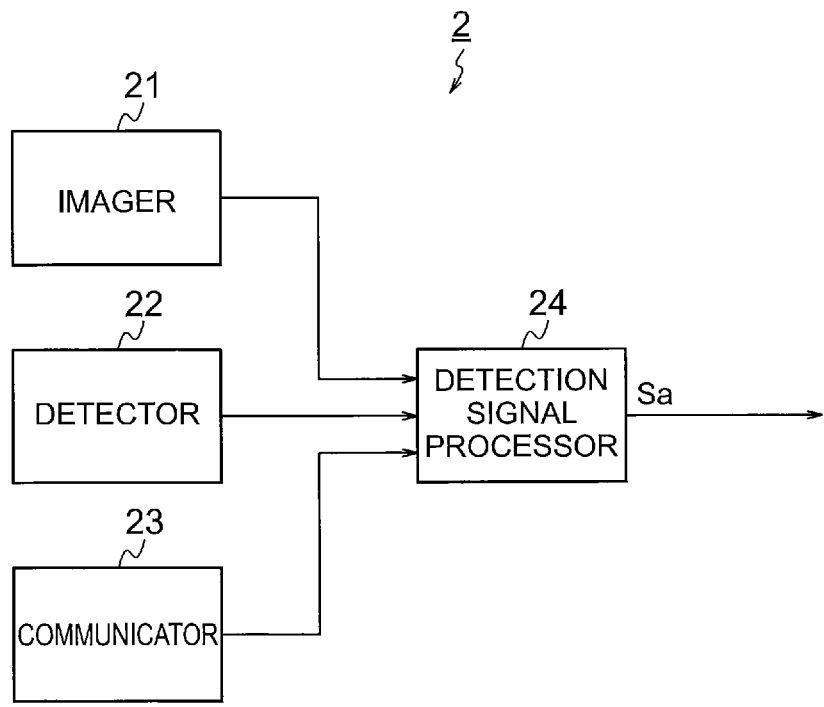
FIG. 3 is a functional block diagram illustrating an example of a configuration of an external situation detector of FIG. 1.

The external situation detector 2 includes an imager 21, a detector 22, a communicator 23, and a detection signal processor 24, for example, as illustrated in FIG. 3.

The imager 21 images an area around the vehicle to generate an image (surrounding image) representing the surroundings and output an image signal. The imager 21 includes one or more cameras.

The detector 22 includes one or more of a millimeter-wave sensor, a laser sensor, an infrared sensor, and a sonar, and outputs a detection signal indicating distances to the objects located therearound, directions in which the objects are located, or the like.

The communicator 23 receives information regarding other vehicles provided from outside the vehicle 10. The information regarding other vehicles may include information indicating the positions, moving directions, and moving speeds of the other vehicles. The provision from outside the vehicle 10 may be provision by direct communication from the other vehicles, or may be provision by communication via a base station.

The detection signal processor 24 generates and outputs the detection information Sa on the basis of the image signal from the imager 21, the detection signal from the detector 22, and the information received by the communicator 23.

The detection information Sa from the detection signal processor 24 may include information indicating the positions of the objects.

The information display control device 4 controls display on the display 6 on the basis of the detection information Sa from the external situation detector 2.

The display 6 is formed by a windshield display using a windshield as a half mirror, for example.

The windshield display is a transmissive display that forms a virtual image at a given distance from a viewpoint of a user, e.g., a driver, and is also referred to as a head-up display when a special combiner is used.

For example, the information display control device 4 displays, in a display region of the display 6, images of virtual objects indicating the positions of the objects located around the vehicle.

A virtual region is used for formation of the images of the virtual objects displayed in the display region of the display 6.

Figure 4:
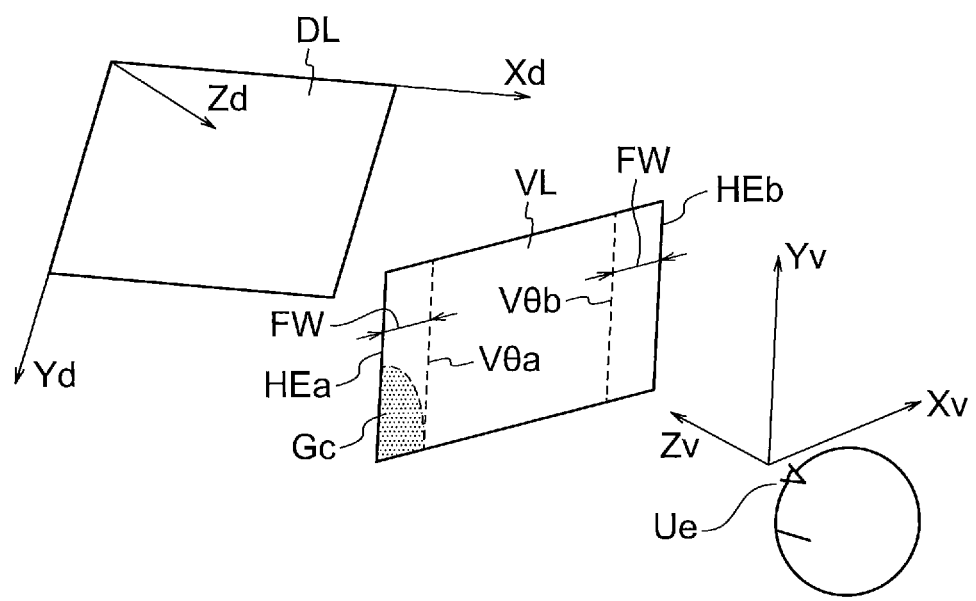
FIG. 4 is a diagram illustrating a positional relationship between a viewpoint of a user, a display region of a display, and a virtual region.

FIG. 4 illustrates the viewpoint Ue of the user, the display region DL of the display 6, and the virtual region VL. The information display control device 4 forms display images by forming images of the virtual objects BJ in the virtual region VL and projecting the formed images of the virtual objects BJ onto the display region DL.

For example, as illustrated in FIG. 4, area(s) having a width FW and extending along at least one of a left edge HEa and a right edge HEb (in the drawing, the left edge HEa) of the virtual region VL is set as specified region(s) AL, and the images of the one or more virtual objects BJ are formed in the specified region(s) AL. In the illustrated example, an image Gc of one virtual object BJ is formed only in the specified region AL having the width FW and extending along the left edge HEa.

To represent a positional relationship between the viewpoint Ue of the user, the display region DL, the virtual region VL, the virtual objects BJ, and the like, a user viewpoint coordinate system and a display region coordinate system are used.

Coordinates in the user viewpoint coordinate system are represented by (Xv, Yv, Zv), and coordinates in the display region coordinate system are represented by (Xd, Yd, Zd).

The user viewpoint coordinate system takes the position Ue of the viewpoint of the user as an origin, the direction Ud of a line of sight of the user as a Zv-axis direction, a horizontal direction as an Xv-axis direction, and a direction perpendicular to both the Zv-axis and Xv-axis as a Yv-axis direction.

In this embodiment, as the viewpoint position Ue and line-of-sight direction Ud of the user, a normal position and a normal direction are used.

Here, it is assumed that the display region DL is rectangular, and the display region coordinate system takes the left upper corner as an origin, the direction from the left upper corner toward the right upper corner as an Xd-axis direction, the direction from the left upper corner toward the left lower corner as a Yd-axis direction, and a direction perpendicular to both the Xd-axis and Yd-axis as a Zd-axis direction.

Figure 5:
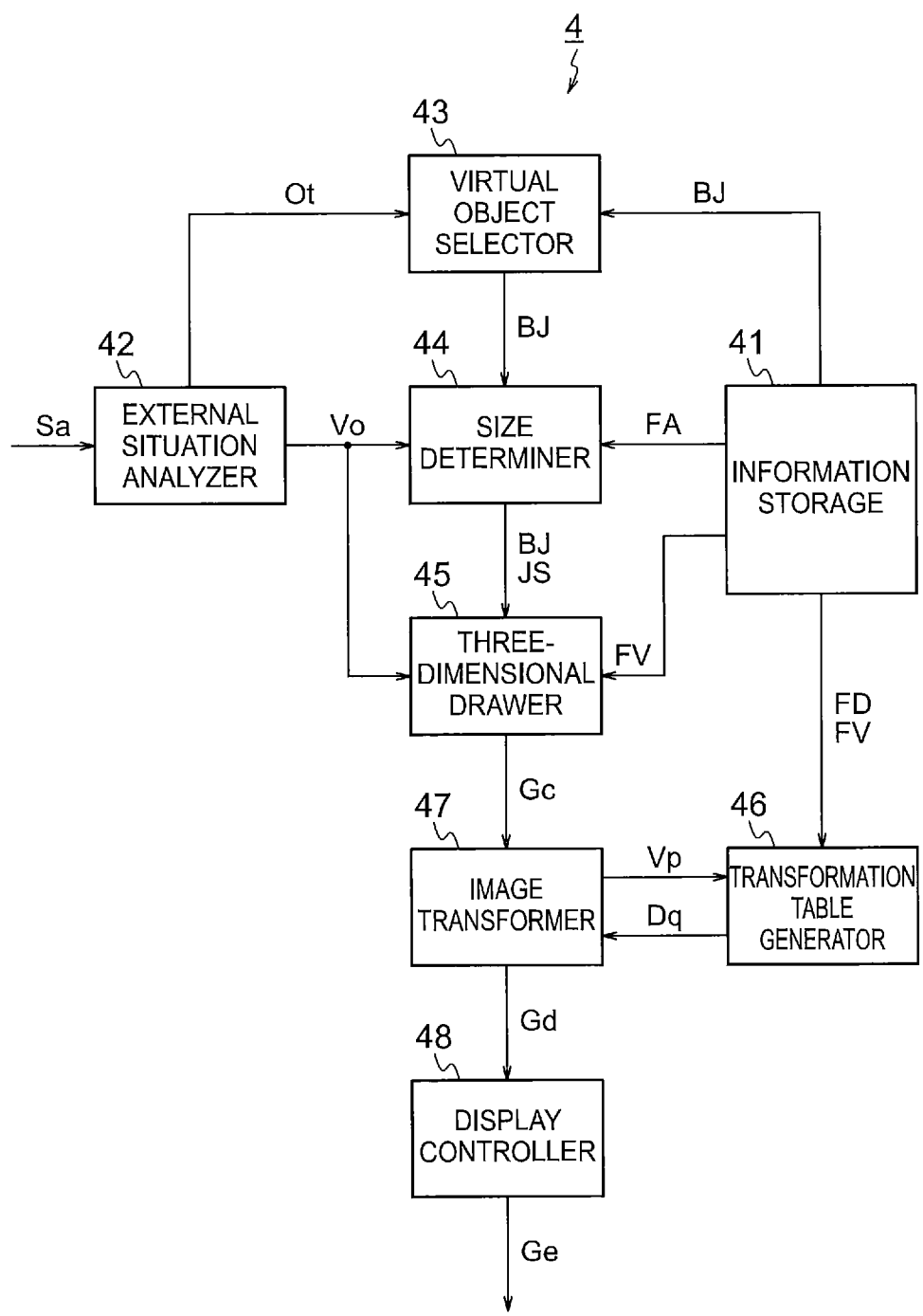
FIG. 5 is a functional block diagram illustrating the information display control device of FIG. 1.

The information display control device 4 includes an information storage 41, an external situation analyzer 42, a virtual object selector 43, a size determiner 44, a three-dimensional drawer 45, a transformation table generator 46, an image transformer 47, and a display controller 48, as illustrated in FIG. 5.

The information storage 41 stores virtual object information FJ, display region information FD, virtual region information FV, and specified region information FA. The information storage 41 also stores information indicating the viewpoint position Ue of the user relative to the vehicle and information indicating the line-of-sight direction Ud of the user relative to the vehicle. The expression "relative to the vehicle" refers to "in a vehicle coordinate system". The vehicle coordinate system is defined so that it takes an arbitrary reference point in the vehicle as an origin and an arbitrary direction as one coordinate axis, for example.

The virtual object information FJ is information indicating properties of each of multiple virtual objects. Each virtual object is a model (three-dimensional model) of a solid figure, and a model, e.g., a polygon model, that can be represented by three-dimensional graphics is used. The properties of each virtual object include information indicating the shape, information indicating the color, and information indicating the transmittance.

The shapes of the multiple virtual objects stored in the information storage 41 include spheres and cones. The cones include circular cones and polygonal pyramids. The virtual objects may have other shapes. However, they preferably have shapes such that invisible parts thereof can be perceived by amodal completion.

The display region information FD includes information (position information) indicating the position of the display region DL. For example, when the display 6 is a windshield display, the display region DL is a virtual surface where virtual images are formed.

The information indicating the position of the display region DL is, for example, information indicating the positions of the four corners of the display region DL.

As the information indicating the position of the display region DL, three-dimensional coordinates in the user viewpoint coordinate system are stored in the information storage 41.

Figure 6:
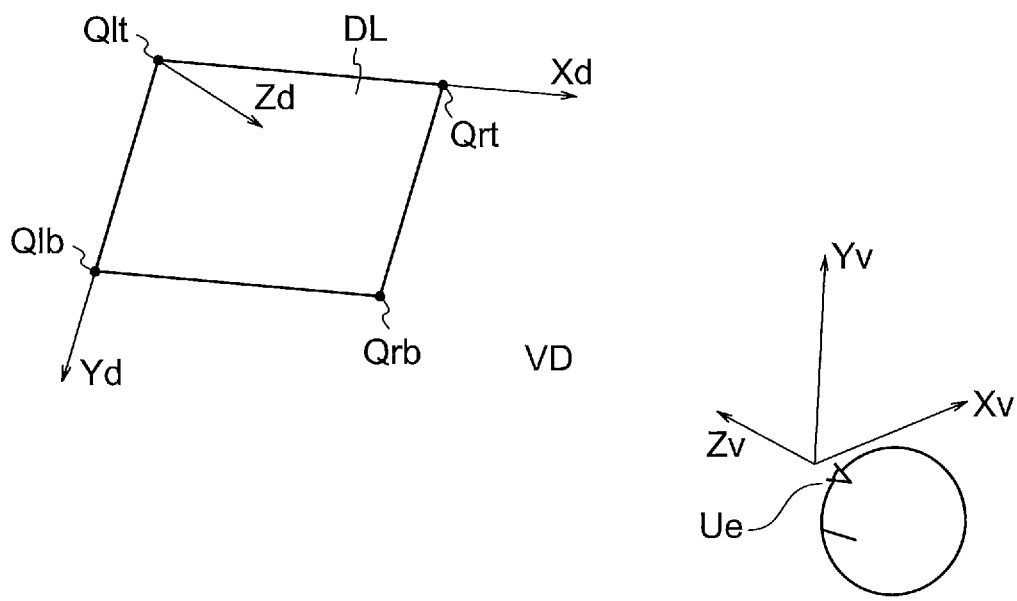
FIG. 6 is a diagram illustrating a positional relationship between a user viewpoint coordinate system and a display region coordinate system.

In FIG. 6, the four corners, i.e., the left upper corner, right upper corner, left lower corner, and right lower corner, of the display region DL are indicated by reference characters Qlt, Qrt, Qlb, and Qrb.

The three-dimensional coordinates of the four corners Qlt, Qrt, Qlb, and Qrb in the user viewpoint coordinate system are respectively denoted by Vdlt, Vdrt, Vdlb, and Vdrb. Each of the three-dimensional coordinates Vdlt, Vdrt, Vdlb, and Vdrb consist of an Xv-coordinate, a Yv-coordinate, and a Zv-coordinate.

The display region coordinate system takes the left upper corner Qlt of the display region DL as the origin, the direction from the left upper corner Qlt toward the right upper corner Qrt as the Xd-axis, the direction from the left upper corner Qlt toward the left lower corner Qlb as the Yd-axis, and the direction perpendicular to both the Xd-axis and Yd-axis as the Zd-axis, as described above.

The three-dimensional coordinates of the four corners Qlt, Qrt, Qlb, and Qrb in the display region coordinate system are respectively denoted by Dlt, Drt, Dlb, and Drb. Each of the three-dimensional coordinates Dlt, Drt, Dlb, and Drb consist of an Xd-coordinate, a Yd-coordinate, and a Zd-coordinate.

In addition to the above information indicating the position of the display region DL, the display region information FD includes information indicating the size of the display region DL. As the size of the display region DL, the number Wd of pixels in a width direction (horizontal direction) and the number Hd of pixels in a height direction (vertical direction) of the display region DL are stored.

In the display region coordinate system, a length is indicated by the number of pixels, and the three-dimensional coordinates of the left upper corner Qlt, right upper corner Qrt, left lower corner Qlb, and right lower corner Qrb are as follows:

Dlt: (Xdlt, Ydlt, Zdlt): (0,0,0)
Drt: (Xdrt, Ydrt, Zdrt): (Wd,0,0)
Dlb: (Xdlb, Ydlb, Zdlb): (0,Hd,0)
Drb: (Xdrb, Ydrb, Zdrb): (Wd,Hd,0)

The virtual region information FV includes information (position information) indicating the position of the virtual region VL. The virtual region VL is a virtual region used for formation of the images of the virtual objects.

Hereinafter, it is assumed that the virtual region VL is also a rectangular region. In this case, as the virtual region information FV, three-dimensional coordinates indicating the positions of the four corners of the virtual region VL in the user viewpoint coordinate system may be stored.

Figure 7:
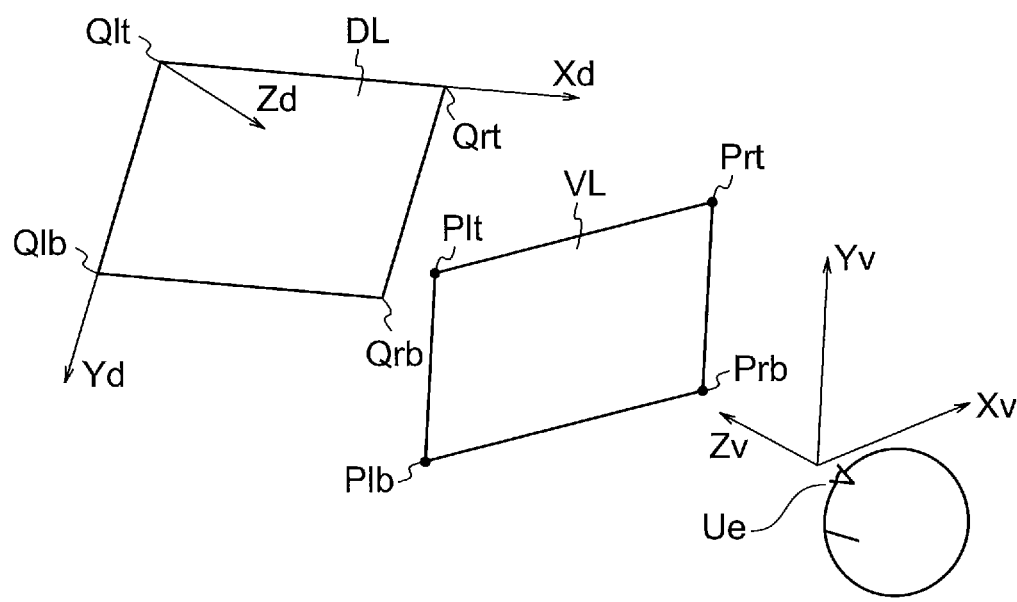
FIG. 7 is a diagram illustrating a relationship between the user viewpoint coordinate system, the display region coordinate system, and the virtual region.

FIG. 7 illustrates the virtual region VL in addition to the viewpoint Ue of the user and the display region DL illustrated in FIG. 6. Further, in FIG. 7, the four corners, i.e., a left upper corner, a right upper corner, a left lower corner, and a right lower corner, of the virtual region VL are indicated by reference characters Plt, Prt, Plb, and Prb.

The three-dimensional coordinates of the four corners in the user viewpoint coordinate system are respectively denoted by Vvlt, Vvrt, Vvlb, and Vvrb. Each of the three-dimensional coordinates Vvlt, Vvrt, Vvlb, and Vvrb consist of an Xv-coordinate, a Yv-coordinate, and a Zv-coordinate.

It is assumed that a surface of the virtual region VL is perpendicular to the Zv-axis and a center of the virtual region VL is located on the Zv-axis. Also, it is assumed that sides in a width direction and sides in a height direction of the virtual region VL are parallel to the Xv-axis and Yv-axis of the user viewpoint coordinate system, respectively. Further, it is assumed that the virtual region VL has a width of Vw and a height of Vh, and the distance from the user viewpoint Ue to the center of the virtual region VL is Vf.

Then, coordinates of the left upper corner Plt, right upper corner Prt, left lower corner Plb, and right lower corner Prb of the virtual region VL are as follows:

Vvlt: (Xvlt, Yvlt, Zvlt): (−Vw/2, Vh/2, Vf)
Vvrt: (Xvrt, Yvrt, Zvrt): (Vw/2, Vh/2, Vf)
Vvlb: (Xvlb, Yvlb, Zvlb): (−Vw/2, −Vh/2, Vf)
Vvrb: (Xvrb, Yvrb, Zvrb): (Vw/2, −Vh/2, Vf)

As above, the coordinates in the user viewpoint coordinate system indicating the positions of the four corners of the virtual region VL can be calculated from the distance Vf from the user viewpoint Ue and the width Vw and height Vh of the virtual region. In this embodiment, as information required for calculation of the positions of the four corners of the virtual region VL, information indicating the above distance Vf, width Vw, and height Vh is stored in the information storage 41.

The specified region information FA is information indicating the size of the specified region(s) AL. When an area having the width FW and extending along the left edge HEa of the virtual region VL is specified as a specified region AL as illustrated in FIG. 4, the width FW is the size of the specified region, and information indicating the width FW is stored as the specified region information FA in the information storage 41.

The specified region(s) AL are region(s) used for formation of the images of the virtual objects, and the images formed in the specified region(s) AL are projected onto the display region DL and displayed.

The external situation analyzer 42 obtains, on the basis of the detection information Sa output from the external situation detector 2, information indicating the positions Vo of the objects located around the vehicle. Such information indicating the positions Vo of the objects is indicated by coordinates (Xvo, Yvo, Zvo) in the user viewpoint coordinate system, for example.

The positions of the objects are representative positions of the objects, e.g., the positions of centers or centers of gravity of the objects.

The following description assumes that only one object located around the vehicle has been detected. However, when multiple objects have been detected, the same process may be performed for each object.

The external situation analyzer 42 also determines, on the basis of the detection information Sa output from the external situation detector 2, the type Ot of the object located around the vehicle, and outputs information indicating the type Ot of the object identified as a result of the determination.

The information indicating the type of the object may be, for example, information that indicates which of a vehicle, a person, a structure, and the like the object is, and when it is a vehicle, further indicates which of a four-wheel automobile, a two-wheel automobile, and a bicycle the object is, and when it is a four-wheel automobile, further indicates which of a passenger vehicle, a truck, a bus, and the like the object is.

The type of the object can be identified by image recognition on the object in an image. The recognition can be performed not only by using images obtained by imaging by the cameras, but also by using data obtained by the laser sensor, millimeter-wave sensor, or the like.

The determination of the type of the object can be implemented by known object recognition techniques. For example, it is possible to use a technique using histogram of oriented gradients (Hog) features or a technique using a deep neural network.

The virtual object selector 43 selects one of the multiple virtual objects stored in the information storage 41, and outputs information indicating the selected virtual object BJ.

Here, it is assumed that the virtual object selector 43 performs the virtual object selection in accordance with the type Ot of the object detected by the external situation analyzer 42. For example, it is possible to select a virtual object that suggests the type Ot of the object. It is also possible to previously associate the virtual objects with types of objects and select a virtual object associated with the detected type of the object.

The following description describes a case where one that is spherical and non-transparent is selected.

The size determiner 44 determines the size JS of the virtual object on the basis of the specified region information FA stored in the information storage 41, the information indicating the virtual object BJ selected by the virtual object selector 43, and the information indicating the position Vo of the object output from the external situation analyzer 42.

Here, since it is assumed that the virtual object is spherical, the radius r of the sphere is determined as the size JS of the virtual object.

The size determiner 44 outputs information indicating the determined size JS together with information indicating the selected virtual object BJ.

The three-dimensional drawer 45 generates an image Gc of the virtual object on the basis of the virtual region information FV stored in the information storage 41, the information indicating the position Vo of the object output from the external situation analyzer 42, the information indicating the virtual object BJ selected by the virtual object selector 43, and the information indicating the size JS determined by the size determiner 44. The three-dimensional drawer 45 generates the image Gc of the virtual object by placing the virtual object BJ at the position Vo of the object and performing a perspective projection of the virtual object BJ thus placed onto the virtual region VL with the user viewpoint Ue as a reference.

"Placing the virtual object BJ at the position Vo of the object" refers to positioning the virtual object BJ so that a reference point of the virtual object BJ coincides with the position of the object. When the virtual object BJ is spherical, the reference point thereof is the center of the sphere.

"Performing a perspective projection of the virtual object onto the virtual region VL with the user viewpoint Ue as a reference" refers to projecting each point of the virtual object onto the virtual region VL with a straight line passing through the user viewpoint Ue.

The transformation table generator 46 generates a transformation table CT on the basis of the display region information FD and virtual region information FV. The transformation table CT represents a correspondence relationship between multiple points located in the virtual region VL and the corresponding points in a plane (a display region surface) DS including the display region DL. The above multiple points will be referred to below as grid points. The multiple grid points are located at intersections between multiple vertical lines and multiple horizontal lines that divide the virtual region VL, for example.

The image transformer 47 generates a transformed image Gd by transforming the image Gc output from the three-dimensional drawer 45 by using the transformation table CT.

The transformation is performed by inputting user viewpoint coordinates Vp (Xvp, Yvp, Zvp) of each pixel of the image Gc into the transformation table CT and reading, from the transformation table CT, display region coordinates Dq (Xdq, Ydq) corresponding to the input coordinates.

For pixels of the image Gc that are not located at any of the grid points, the image transformer 47 calculates the corresponding positions by performing interpolation using grid points around the positions of the pixels.

The display controller 48 supplies a part of the transformed image Gd generated as described above within the display region DL, as a display image Ge, to the display 6, and causes the display 6 to display it.

The above processes, that is, the determination of the type of the object and the detection of the position of the object by the external situation analyzer 42, the determination of the size of the virtual object by the size determiner 44, the drawing by the three-dimensional drawer 45, the image transformation by the image transformer 47, and the process of driving and controlling the display 6 by the display controller 48, are performed repeatedly.

By performing them repeatedly, it is possible to make the content of the display image follow the change in the object position.

In the above description, the information generated by each functional block is supplied directly to other functional block(s). However, it may be supplied to the other functional block(s) after being stored once in a memory (not illustrated). The same applies to the other embodiments described below.

Hereinafter, the determination of the size JS of the virtual object BJ in the size determiner 44 will be described in detail.

In this embodiment, the size JS of the virtual object BJ is determined on the basis of the specified region information FA.

The specified region information FA is information indicating the width of the specified region(s) AL. As described above, the image of the virtual object is formed in the specified region(s) AL having the width FW and extending along edge(s) of the virtual region.

For example, in the example illustrated in FIG. 4, the image of the virtual object is formed in the specified region(s) AL having the width FW and extending along the left edge HEa or right edge HEb of the virtual region. In the illustrated example, the image of the virtual object is formed in the specified region AL having the width FW and extending along the left edge HEa of the virtual region. This is because it is assumed that the object is located to the left of an area of a view angle when the virtual region VL is viewed from the user viewpoint Ue (an area defined by a group of straight lines connecting the user viewpoint Ue and the edges of the virtual region). "An area of a view angle when the virtual region VL is viewed from the user viewpoint Ue" described above will be referred to below as the virtual region area.

The width FW of the specified region(s) is determined so that the image of the virtual object is located outside an area of a reference view angle.

The reference view angle refers to an angular range that is in the virtual region area and attended to by the user. The reference view angle includes a reference horizontal view angle and a reference vertical view angle. The reference horizontal view angle is a reference view angle in the horizontal direction. The reference vertical view angle is a reference view angle in the vertical direction.

For example, in the case of indicating the position of an object located to the left or right (horizontally outside) of the virtual region area, the reference horizontal view angle is used as the reference view angle. The reference horizontal view angle includes a left reference horizontal view angle θa and a right reference horizontal view angle θb.

Each of the left reference horizontal view angle θa and right reference horizontal view angle θb is set between about 15 and 60 degrees. The left reference horizontal view angle θa and the right reference horizontal view angle θb may be equal to or different from each other.

Figure 8:
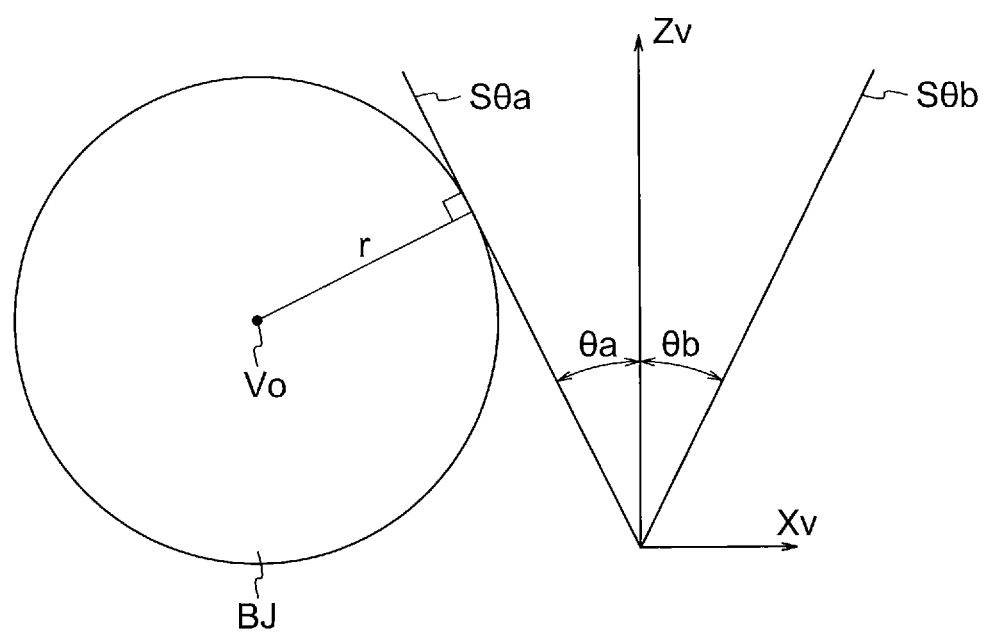
FIG. 8 is a diagram illustrating a relationship between a reference horizontal view angle and a size of a virtual object.
Figure 9A:
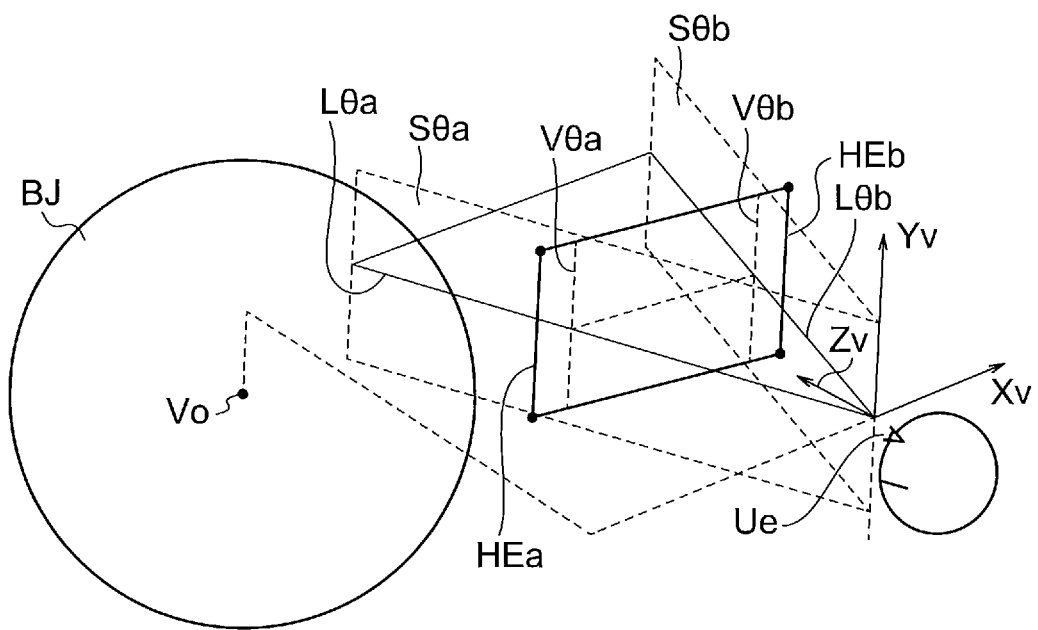
FIG. 9A is a diagram illustrating a relationship between the reference horizontal view angle and the size of the virtual object.

As illustrated in FIGS. 8 and 9A, a pair of straight lines Lθa and Lθb forming the angles θa and θb with the Zv-axis in the Xv-Zv plane in the user viewpoint coordinate system are drawn, and boundary surfaces Sθa and Sθb are formed by trajectories obtained by moving the straight lines Lθa and Lθb in the Yv-axis direction. Although the straight lines Lθa and Lθb and boundary surfaces Sθa and Sθb extend infinitely, FIG. 9A illustrates only part of the straight lines Lθa and Lθb and boundary surfaces Sθa and Sθb. The boundary surfaces Sθa and Sθb can be said to be surfaces that define the area of the reference horizontal view angle.

Figure 9B:
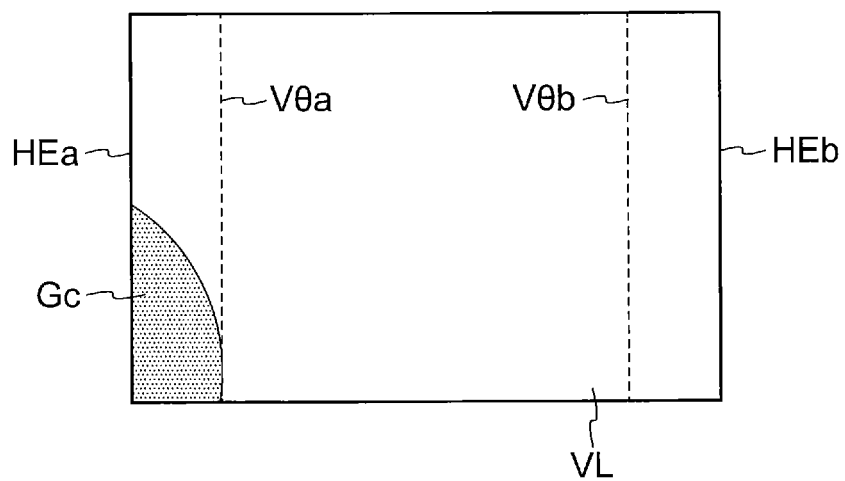
FIG. 9B is a diagram illustrating an area in which an image of the virtual object is formed in the virtual region.

In FIGS. 9A and 9B, intersection lines between the boundary surfaces Sθa and Sθb and the virtual region VL are indicated by reference characters Vθa and Vθb. The dimensions from the left and right edges HEa and HEb of the virtual region VL to the intersection lines Vθa and Vθb are the width FW of the specified region(s).

When a desired width FW is previously determined, the virtual region VL is determined so that the specified region(s) AL having the width FW can be secured outside the area of the reference horizontal view angles θa and θb.

Next, the generation of the image of the virtual object in the three-dimensional drawer 45 will be described in detail.

The generation of the image of the virtual object in the three-dimensional drawer 45 can be implemented by performing rendering by using three-dimensional graphics.

Specifically, it generates a three-dimensional sphere model having the radius r and centered at the position Vo of the object obtained by the external situation analyzer 42. This sphere model is the virtual object BJ.

Then, the image of the virtual object is formed by performing a perspective projection of the virtual object BJ onto the virtual region VL with the user viewpoint Ue as a reference. This may be achieved by generating a projection matrix on the basis of coordinates of the four corners of the virtual region VL and performing rendering by three-dimensional graphics.

Such processing can be implemented by using three-dimensional graphics libraries, such as OpenGL or DirectX.

As described above, the spherical virtual object BJ is positioned so that the position of its center coincides with the position Vo of the object, and its radius r is determined so that its spherical surface is tangent to the boundary surface Sθa or Sθb. Thus, the image Gc of the virtual object is formed outside the intersection line Vθa or Vθb in such a manner that a tip (a portion closest to a center of the virtual region VL) thereof is tangent to the intersection line Vθa or Vθb, as illustrated in FIG. 9B.

In rendering the virtual object by three-dimensional drawing, it is possible to apply processing for representing sphere characteristics. Such processing includes lighting processing for providing a shiny appearance, blending for providing an appearance of a translucent glass ball, and the like.

Next, the generation of the transformation table CT in the transformation table generator 46 will be described in detail. The transformation table CT is a table representing a positional relationship between the position of each of the multiple grid points in the virtual region VL and the point corresponding to the grid point on the display region surface DS. The corresponding point is an intersection of a straight line passing through the grid point on the virtual region VL and the user viewpoint Ue with the display region surface DS.

The transformation table CT is generated by using the display region information FD and virtual region information FV.

Here, it is assumed that the coordinates Vdlt, Vdrt, Vdlb, and Vdrb in the user viewpoint coordinate system indicating the positions of the left upper corner, right upper corner, left lower corner, and right lower corner of the display region DL, the information indicating the number Wd of pixels in the horizontal direction of the display region DL, and the information indicating the number Hd of pixels in the vertical direction of the display region DL are stored as the display region information FD in the information storage 41, as illustrated in FIG. 6.

Also, it is assumed that the information indicating the distance Vf of the virtual region VL from the user viewpoint Ue, the information indicating the width Vw of the virtual region VL, and the information indicating the height Vh of the virtual region VL are stored as the virtual region information FV in the information storage 41.

By using the distance Vf, width Vw, and height Vh indicated by the stored information, it is possible to calculate the coordinates Vvlt, Vvrt, Vvlb, and Vvrb of the left upper corner Plt, right upper corner Prt, left lower corner Plb, and right lower corner Prb of the virtual region VL in the user viewpoint coordinate system.

In generating the transformation table CT, a transformation matrix Mvd for transforming coordinates (Xv, Yv, Zv) in the user viewpoint coordinate system into coordinates (Xd, Vd, Zd) in the display region coordinate system is first calculated.

The transformation from coordinates (Xv, Yv, Zv) in the user viewpoint coordinate system into coordinates (Xd, Vd, Zd) in the display region coordinate system is expressed by the following equation:

$$(Xd, Yd, Zd, 1)^t = Mvd(Xv, Yv, Zv, 1)^t. \tag{1}$$

In equation (1), t denotes transposition.

Mvd is given by the following equation (2):

$$Mvd = \begin{pmatrix} S & 0 \\ 0 & 1 \end{pmatrix} \begin{pmatrix} R & T \\ 0 & 1 \end{pmatrix}. \quad (2)$$

In equation (2), S is a 3×3 magnification matrix having only diagonal components, R is a 3×3 rotation matrix, and T is a three-dimensional column vector.

Since R and T to be calculated consist of 12 elements in total, they can be solved when there are 12 simultaneous equations. Thus, 12 simultaneous equations are generated by substituting, for Xv, Yv, Zv and Xd, Yd, Zd, the following combinations:

Vdlt (Xvdlt, Yvdlt, Zvdlt) and Dlt (Xdlt, Ydlt, Zdlt),
Vdrt (Xvdrt, Yvdrt, Zvdrt) and Drt (Xdrt, Ydrt, Zdrt),
Vdlb (Xvdlb, Yvdlb, Zvdlb) and Dlb (Xdlb, Ydlb, Zdlb), and
Vdrb (Xvdrb, Yvdrb, Zvdrb) and Drb (Xdrb, Ydrb, Zdrb).

Specifically, a first simultaneous equation is generated by substituting the first element (Xvdlt) of Vdlt and the first element (Xdlt) of Dlt for Xv and Xd, a second simultaneous equation is generated by substituting the second element (Yvdlt) of Vdlt and the second element (Ydlt) of Dlt for Yv and Yd, a third simultaneous equation is generated by substituting the third element (Zvdlt) of Vdlt and the third element (Zdlt) of Dlt for Zv and Zd, a fourth simultaneous equation is generated by substituting the first element (Xvdrt) of Vdrt and the first element (Xdrt) of Drt for Xv and Xd, a fifth simultaneous equation is generated by substituting the second element (Yvdrt) of Vdrt and the second element (Ydrt) of Drt for Yv and Yd, a sixth simultaneous equation is generated by substituting the third element (Zvdrt) of Vdrt and the third element (Zdrt) of Drt for Zv and Zd, a seventh simultaneous equation is generated by substituting the first element (Xvdlb) of Vdlb and the first element (Xdlb) of Dlb for Xv and Xd, an eighth simultaneous equation is generated by substituting the second element (Yvdlb) of Vdlb and the second element (Ydlb) of Dlb for Yv and Yd, a ninth simultaneous equation is generated by substituting the third element (Zvdlb) of Vdlb and the third element (Zdlb) of Dlb for Zv and Zd, a tenth simultaneous equation is generated by substituting the first element (Xvdrb) of Vdrb and the first element (Xdrb) of Drb for Xv and Xd, an eleventh simultaneous equation is generated by substituting the second element (Yvdrb) of Vdrb and the second element (Ydrb) of Drb for Yv and Yd, and a twelfth simultaneous equation is generated by substituting the third element (Zvdrb) of Vdrb and the third element (Zdrb) of Drb for Zv and Zd.

Then, the transformation matrix Mvd can be obtained by solving the generated simultaneous equations.

Then, by using the transformation matrix Mvd thus obtained, from the user viewpoint coordinates (Xv, Yv, Zv) indicating the position of each of the multiple grid points in the virtual region VL, the display region coordinates (Xd, Yd) of the corresponding point on the display region surface DS is calculated.

A point Qp on the display region DL corresponding to a point Pp on the virtual region VL is a point where a straight line connecting the viewpoint Ue and the point Pp intersects the display region surface DS.

Figure 10:
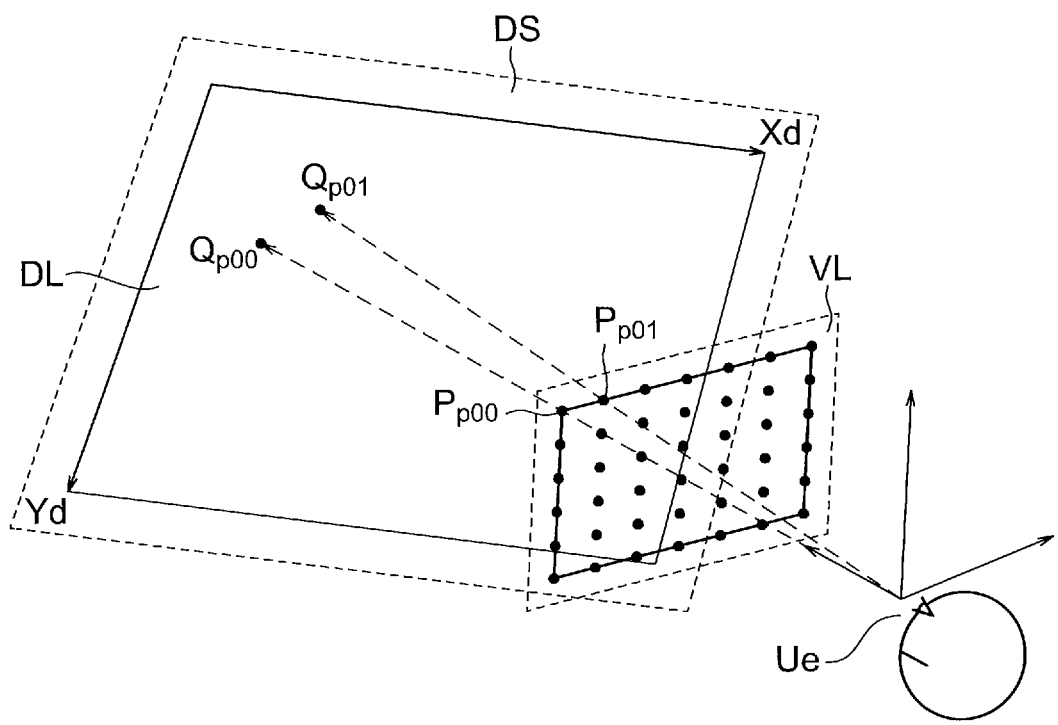
FIG. 10 is a diagram illustrating a correspondence relationship between points on the virtual region and points on the display region surface.

FIG. 10 illustrates, for two grid points Pp00 and Pp01 on the virtual region VL, the corresponding points Qp00 and Qp01 on the display region surface DS.

FIG. 11A illustrates the multiple grid points (each represented by a solid black circle) regularly arranged in the virtual region VL, and FIG. 11B illustrates, for the multiple grid points illustrated in FIG. 11A, the corresponding points (each represented by a solid black circle) on the display region surface DS.

This calculation is performed by obtaining Xd and Yd obtained from $$(Xd,Yd,Zd,1)^t = tMvd(Xv,Yv,Zv,1)^t \quad (3)$$

when $t$ is determined so that $$Zd = 0 \quad (4)$$

In equation (3), t is a parameter.

The reason why Xd and Yd are obtained in this manner is because the user viewpoint coordinates of a point on a straight line connecting a point P indicated by user viewpoint coordinates (Xv, Yv, Zv) in the virtual region and the user viewpoint Ue are represented by $$t(Xv,Yv,Zv)^t,$$

and the display region coordinates of the point is given by $$Mvd \times t \times (Xv,Yv,Zv)^t = t \times Mvd \times (Xv,Yv,Zv)^t,$$

and the Zd coordinate of a point located in the display region surface DS is 0.

After, from the user viewpoint coordinates (Xv, Yv, Zv) indicating the position of one of the multiple grid points in the virtual region VL, the display region coordinates (Xd, Yd) of the corresponding point on the display region surface DS is calculated in this manner, the user viewpoint coordinates (Xv, Yv, Zv) indicating the position of the one of the multiple grid points in the virtual region VL and the display region coordinates (Xd, Yd) of the corresponding point on the display region surface DS are stored in association with each other.

By repeating this process for all the multiple grid points, a transformation table illustrated in FIG. 12 is generated. That is, the transformation table CT is generated by combinations of the user viewpoint coordinates (Xv, Yv, Zv) indicating the respective positions of all the multiple grid points in the virtual region VL and the display region coordinates (Xd, Yd) of the corresponding points on the display region surface DS associated with the user viewpoint coordinates.

Since Zv=Vf for all the grid points, it is possible to generate a transformation table CT representing a relationship between (Xv, Yv) and (Xd, Yd) without including Zv.

The generated transformation table CT is stored in the transformation table generator 46. The stored transformation table CT is used by the image transformer 47.

To improve the quality of the displayed image, it is preferable that the number of grid points be large. On the other hand, as the number of grid points increases, the amount of calculation for generating the transformation table CT increases. These should be taken into account in determining the number of grid points.

FIGS. 11A and 11B illustrate generating the transformation table CT by determining the corresponding points on the display region surface DS over the entire virtual region. However, it is possible to generate the transformation table CT by determining the corresponding points in the display region surface DS for only grid points in the specified region(s) AL.

Next, the process of generating the transformed image Gd in the display region DL from the image in the virtual region VL by the image transformer 47 will be described in detail.

The transformation table CT stored in the transformation table generator 46 is used in generating the transformed image Gd.

The transformed image Gd is generated by projecting the image in the virtual region VL onto the display region surface DS.

To project the image in the virtual region VL onto the display region surface DS, the pixels of the image in the virtual region VL are sequentially selected, and coordinates of the point corresponding to the selected pixel (pixel of interest) on the display region surface DS are determined.

When the pixel of interest is a pixel located at a grid point, the display region coordinates of the corresponding point can be read by referring to the transformation table CT.

When the pixel of interest is a pixel that is not located at any grid point, the display region coordinates of the point corresponding to the pixel of interest can be determined by reading the display region coordinates of the corresponding points for pixels located at grid points around the pixel of interest and performing interpolation.

Figure 13A:
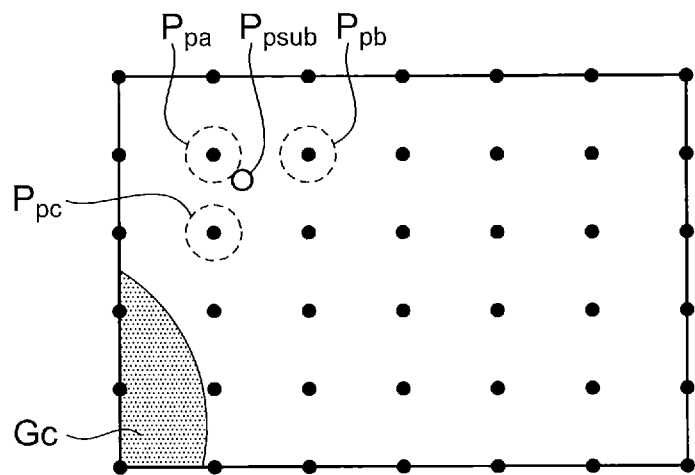
FIGS. 13A and 13B are diagrams illustrating a way of interpolation for a pixel in the virtual region that is not located at any grid point.
Figure 13B:
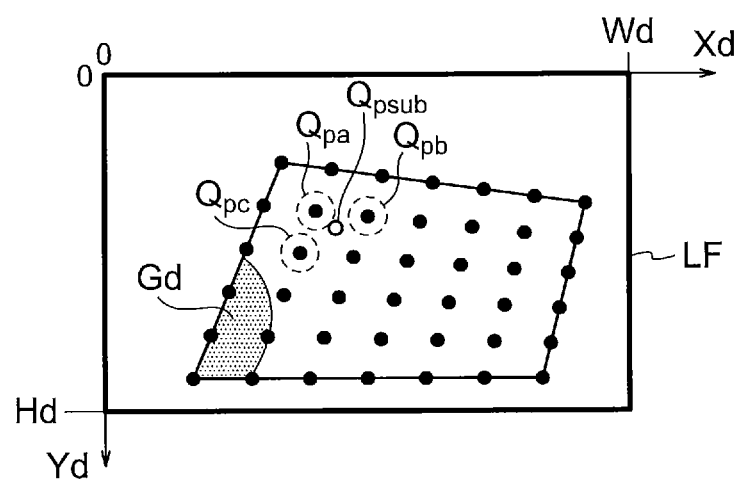

For example, the interpolation is performed on the basis of the display region coordinates of the points corresponding to three grid points located near the pixel of interest and a positional relationship between the pixel of interest and the above three grid points. For example, as illustrated in FIGS. 13A and 13B, the three grid points forming the smallest triangle including the pixel of interest Ppsub are selected as the neighboring three grid points. FIG. 13A illustrates the selected three grid points Ppa, Ppb, and Ppc, and FIG. 13B illustrates the points Qpa, Qpb, and Qpc corresponding to the grid points Ppa, Ppb, and Ppc.

Although FIGS. 13A and 13B illustrate a way of the interpolation for a pixel in a part of the virtual region VL outside the image Gc of the virtual object, the projection onto the display region surface DS may be omitted for the part outside the image Gc of the virtual object.

The above three grid points Ppa, Ppb, and Ppc can be determined by comparing the Xv-coordinate and Yv-coordinate of the pixel of interest Ppsub with the Xv-coordinates and Yv-coordinates of all the grid points on the transformation table CT.

When the coordinates of the three grid points Ppa, Ppb, and Ppc in the user viewpoint coordinate system are denoted by Vpa, Vpb, and Vpc, real numbers s and t satisfying the following equation representing a relationship between the coordinates of the grid points Ppa, Ppb, and Ppc and the relative position of the pixel of interest Ppsub relative to the grid point Ppa are calculated. Here, the superscript arrows denote vectors.

$$\overrightarrow{V_{pa}V_{psub}} = s\overrightarrow{V_{pa}V_{pb}} + t\overrightarrow{V_{pa}V_{pc}} \quad (5)$$

Such s and t can be uniquely determined. By substituting s and t into the following equation (6), the coordinates Dpsub after transformation of the coordinates Vpsub, i.e., the coordinates Dpsub of the point on the display region surface DS corresponding to the pixel of interest at the coordinates Vpsub in the virtual region VL can be calculated.

$$\overrightarrow{D_{psub}} = D_{pa} + s\overrightarrow{D_{pa}D_{pb}} + t\overrightarrow{D_{pa}D_{pc}} \quad (6)$$

The position indicated by the coordinates Dpsub after transformation thus determined is given the same properties (such as the color or transmittance) as the pixel at the original position.

The display controller 48 causes the display 6 to display the image Ge consisting of pixel data of the transformed image Gd generated as described above within the display region (ranging from 0 to Wd in the Xd-axis direction and from 0 to Hd in the Yd-axis direction) indicated by bold frame LF in FIG. 13B. When the display 6 is a windshield display, a virtual image is generated.

By repeatedly performing the above process from the acquisition of the position of the object and the determination of the type of the object to the display control, it is possible to change the content of the display image in accordance with the change in the object position.

When an image of part of the virtual object is displayed in the display region DL of the display 6 by performing the process as described above, the user can perceive the part of the virtual object that is not being displayed, by amodal completion, and intuitively perceive the position of the center of the virtual object (the center of the sphere). Thereby, it is possible to perceive the position of the object.

In the above description, a sphere is selected as the virtual object BJ, the virtual object BJ is placed so that the sphere is centered at the position Vo of the object, and the radius r of the sphere is determined as the size of the virtual object BJ.

When a cone is selected as the virtual object BJ, it is possible to consider the vertex of the cone as a reference point, place the virtual object so that the vertex of the cone is located at the position Vo of the object, and determine the height of the cone as the size of the virtual object. In this case, for example, the height of the cone may be determined so that the base of the cone is tangent to a surface that defines the area of the reference horizontal view angle, e.g., the boundary surface Sθa or Sθb in FIG. 9A.

In the above example, the width FW is determined on the basis of the reference horizontal view angle, and the image of the virtual object corresponding to the object located outside the virtual region area in the horizontal direction is formed in the specified region(s) AL having the width FW and extending along the left or right edge of the virtual region. Alternatively, it is possible that the width FW is determined on the basis of the reference vertical view angle, and an image of a virtual object corresponding to an object located outside the virtual region area in the vertical direction is formed in specified region(s) AL having the width FW and extending along the upper or lower edge of the virtual region.

Further, it is possible that specified region(s) along the left or right edge of the virtual region and specified region(s) along the upper or lower edge of the virtual region are both provided, and images of virtual objects are formed for both an object located outside the virtual region area in the horizontal direction and an object located outside the virtual region area in the vertical direction.

The width of the specified region(s) along the left or right edge of the virtual region and the width of the specified region(s) along the upper or lower edge of the virtual region may be equal or different. Also, the width of the specified region along the left edge of the virtual region and the width of the specified region along the right edge of the virtual region may be equal or different. Likewise, the width of the specified region along the upper edge of the virtual region and the width of the specified region along the lower edge of the virtual region may be equal or different.

In the above example, the size determiner 44 determines the size of the virtual object on the basis of the width FW of the specified region(s). However, alternatively, the size of the virtual object may be determined on the basis of the reference view angle.

In the above example, the width FW of the specified region(s) is determined on the basis of the reference view angle. However, the width FW of the specified region(s) may be determined on the basis of a parameter other than the reference view angle.

In the above example, the virtual object is selected in accordance with the type Ot of the object detected by the external situation analyzer 42. Alternatively, the virtual object may be selected in accordance with information regarding the object other than the type of the object. For example, the virtual object may be selected in accordance with the size or position of the object.

Also, for example, the virtual object may be allowed to be selected in accordance with the preference of the user. In this case, it is possible that a virtual object is selected upon start of the driving assistance system, and the same virtual object continues to be used.

The information storage 41 may store only one virtual object. In this case, the virtual object selector 43 is unnecessary, the external situation analyzer 42 need not determine the type or the like of the object to select the virtual object, the size determiner 44 determines the size for the only one virtual object stored in the information storage 41, and the three-dimensional drawer 45 draws the only one virtual object stored in the information storage 41.

In the above example, the display region information FD includes information indicating the positions of the four corners of the display region DL. The display region information FD may include information required to calculate the positions of the four corners of the display region DL, instead of the information indicating the positions of the four corners of the display region DL. For example, it may include information indicating the center position of the display region DL, information indicating the size (e.g., the number of pixels) in the horizontal direction, information indicating the size (e.g., the number of pixels) in the vertical direction, and information indicating the tilt angle relative to the line of sight.

In the above example, the virtual region information FV includes information indicating the distance Vf to the user viewpoint Ue and information indicating the width Vw and height Vh. Alternatively, the virtual region information FV may include information indicating the positions of the four corners of the virtual region VL. In short, it is sufficient that the virtual region information FV includes information indicating the positions of the four corners of the virtual region VL or information required to calculate the positions of the four corners.

In the above example, the center of the virtual region VL is located on the line of sight. However, it can be arbitrarily located as long as the virtual region VL is perpendicular to the line of sight and its horizontal and vertical sizes are parallel to the user viewpoint Xv- and Yv-axes.

It is preferable that the position (the distance Vf from the user viewpoint Ue) and the size of the virtual region VL can be arbitrarily set. Specifically, it is preferable that at least one of the information indicating the position of the virtual region VL and the information indicating the size of the virtual region VL of the virtual region information FV stored in the information storage 41 be rewritable, or that, for each of them, multiple information items be stored and selectable.

In the above example, the display 6 is formed by a windshield display. Alternatively, a windshield itself may be caused to directly emit light and used as the display 6. Also, the display 6 may be, for example, an LCD. When an LCD is used, a display surface (where a real image is formed) of the LCD forms the display region DL.

The display 6 may display not only the image of the virtual object but also an imaged image of the surroundings of the vehicle. In this case, the information display control device 4 displays an image of a virtual object for indicating the position of an object located outside the surrounding spatial area corresponding to the displayed imaged image.

In this case, in a portion where the image of the virtual object and the imaged image overlap, it is possible to display only the image of the virtual object or display a combined image by alpha blending.

As the display 6, a display used for another purpose, e.g., a car navigation system, may be shared.

The display 6 may display an image other than the imaged image of the surroundings of the vehicle. For example, it may display a road map, textual information regarding a route, or the like provided by a car navigation system.

Also in these cases, in a portion where the image of the virtual object and the other image overlap, it is possible to display only the image of the virtual object or display a combined image by alpha blending.

In the above example, the information display control device forms part of the driving assistance device, and objects are other vehicles or the like. However, when the information display control device is one that performs data edit or the like, an object may be a cursor.

In this case, a cursor located outside the display region is an object, and an image of a virtual object for indicating the position of the object is displayed.

Second Embodiment

Figure 14:
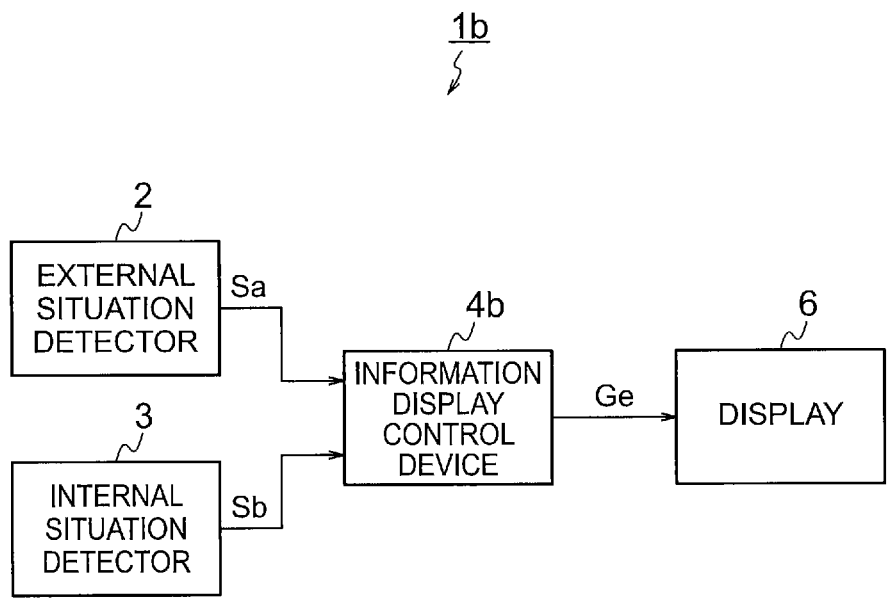
FIG. 14 is a functional block diagram illustrating a driving assistance device including an information display control device of a second embodiment of the present invention.

FIG. 14 illustrates a driving assistance device 1b including an information display control device 4b of a second embodiment of the present invention. The illustrated driving assistance device 1b includes, besides the information display control device 4b, an external situation detector 2, an internal situation detector 3, and a display 6.

The external situation detector 2 and display 6 are the same as those described in the first embodiment.

The information display control device 4 of the first embodiment uses, as the viewpoint position Ue and line-of-sight direction Ud of the user, normal ones. On the other hand, the information display control device 4b of the second embodiment detects the viewpoint position Ue and line-of-sight direction Ud of the user, and uses the detected position and direction in the process.

The internal situation detector 3 detects the viewpoint position Ue and line-of-sight direction Ud of the user, e.g., driver, in the vehicle.

Figure 15:
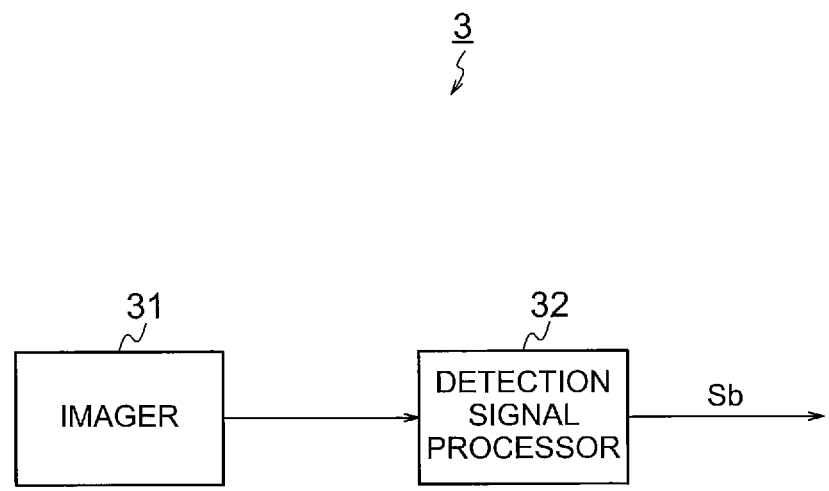
FIG. 15 is a functional block diagram illustrating an example of a configuration of an internal situation detector of FIG. 14.

The internal situation detector 3 includes, for example, an imager 31 and a detection signal processor 32, as illustrated in FIG. 15.

The imager 31 images an inside of the vehicle, in particular the user, e.g., driver, and outputs an image signal. The imager 31 includes one or more cameras.

As the cameras, it is possible to use ones including infrared sensors or light emitting elements for illumination so that the imaging is possible even when the inside of the vehicle is dark.

The detection signal processor 32 generates and outputs detection information Sb on the basis of the image signal from the imager 31.

Figure 16:
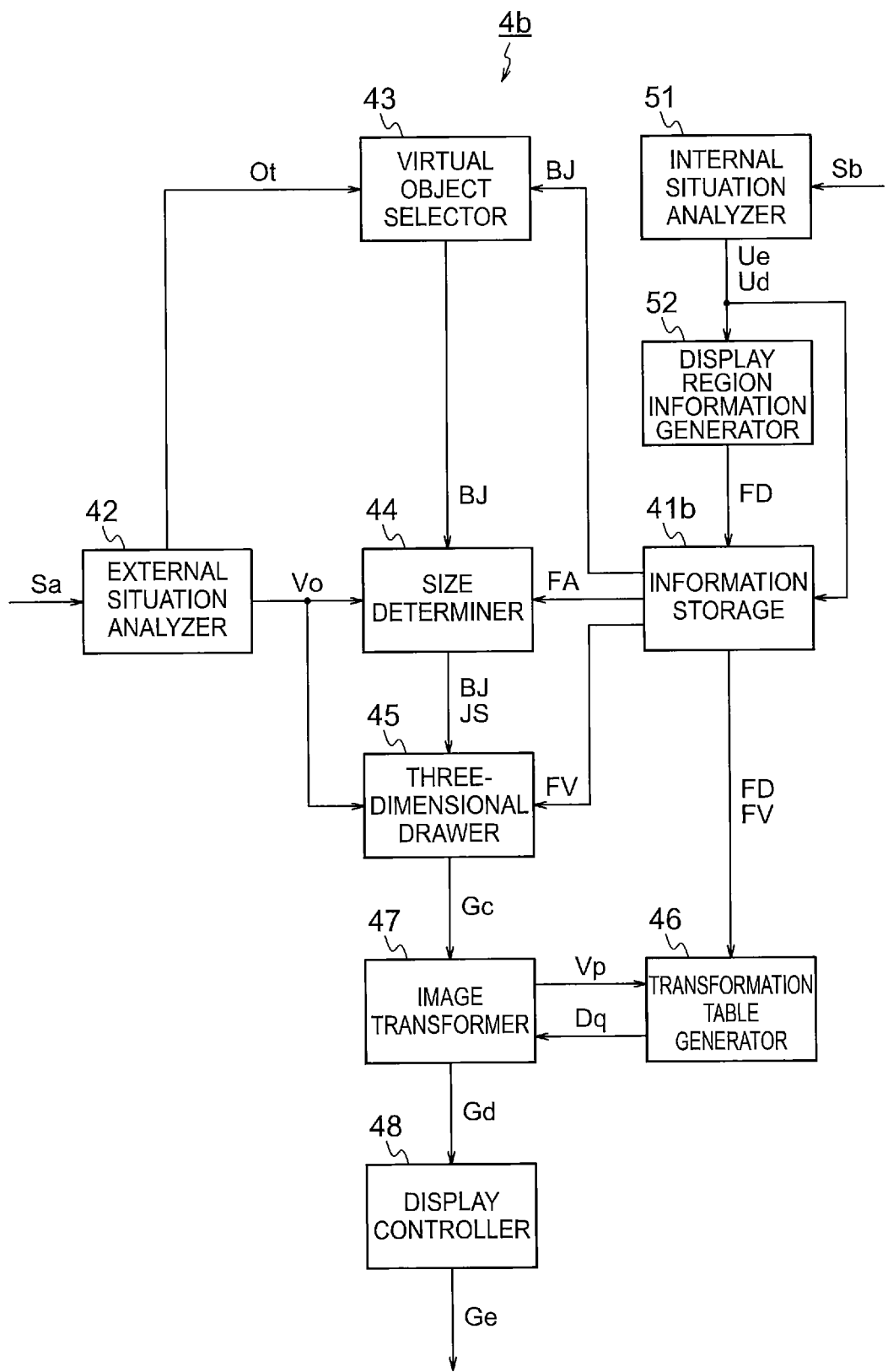
FIG. 16 is a functional block diagram illustrating the information display control device of FIG. 14.

Although the information display control device 4b is similar to the information display control device 4 of the first embodiment, it is different in that it additionally includes an internal situation analyzer 51 and a display region information generator 52, and includes an information storage 41b instead of the information storage 41, as illustrated in FIG. 16.

The internal situation analyzer 51 analyzes an image of the face of the user on the basis of the detection information Sb from the internal situation detector 3, detects the viewpoint position Ue and line-of-sight direction Ud, and outputs information indicating the detected viewpoint position Ue and information indicating the line-of-sight direction Ud.

Any technique, such as triangulation (stereoscopy) using multiple cameras, the time-of-flight (TOF) technique using a monocular camera, may be used to detect the viewpoint position Ue.

The internal situation analyzer 51 writes the information indicating the detected viewpoint position Ue and the information indicating the line-of-sight direction Ud to the information storage 41b. When information indicating the viewpoint position Ue and information indicating the line-of-sight direction Ud are already stored, overwriting is performed.

In this manner, the information indicating the viewpoint position Ue and the information indicating the line-of-sight direction Ud stored in the information storage 41 are updated in accordance with the detection result by the internal situation detector 3.

The display region information generator 52 calculates the coordinates Vdlt, Vdrt, Vdlb, and Vdrb in the user viewpoint coordinate system of the display region information FD, on the basis of the viewpoint position Ue and line-of-sight direction Ud detected by the internal situation analyzer 51. It then writes the display region information FD including the calculated coordinates to the information storage 41b. When the display region information FD is already written, overwriting is performed. Only the coordinates Vdlt, Vdrt, Vdlb, and Vdrb in the user viewpoint coordinate system may be rewritten.

The transformation table generator 46 generates the transformation table CT on the basis of the virtual region information FV and display region information FD stored in the information storage 41b. The transformation table generator 46 stores the generated transformation table CT in the transformation table generator 46. When the transformation table CT is already stored, overwriting is performed.

With such a process, the display region information FD stored in the information storage 41b and the transformation table CT stored in the transformation table generator 46 are updated in accordance with the detection result by the internal situation detector 3. Specifically, they are updated each time at least one of the information indicating the viewpoint position Ue and the information indicating the line-of-sight direction Ud changes.

The image transformer 47 performs the image transformation by using the overwritten transformation table CT.

By detecting the viewpoint position Ue and line-of-sight direction Ud, it is possible to continuously optimally perform the image display even when the viewpoint position or the line-of-sight direction of the user changes.

When the line-of-sight direction Ud is greatly deviated from the direction toward the display region DL, the image formed in the virtual region VL is not displayed in the display region DL. This is because the image formed in the virtual region VL is projected onto a part of the display region surface DS outside the display region DL. However, at this time, since the user's gaze is outside the display region DL, although the image in the virtual region VL is not displayed in the display region DL, there is no inconvenience to the user.

When the gaze is outside the display region DL and the image formed in the virtual region VL is not displayed in the display region DL at all, it is possible to omit part of the functions of the information display control device 4b, such as the determination of the size of the virtual object by the size determiner 44, the drawing of the virtual object by the three-dimensional drawer 45, the formation of the display image by the image transformer 47, and the driving of the display 6 by the display controller 48.

Third Embodiment

Figure 17:
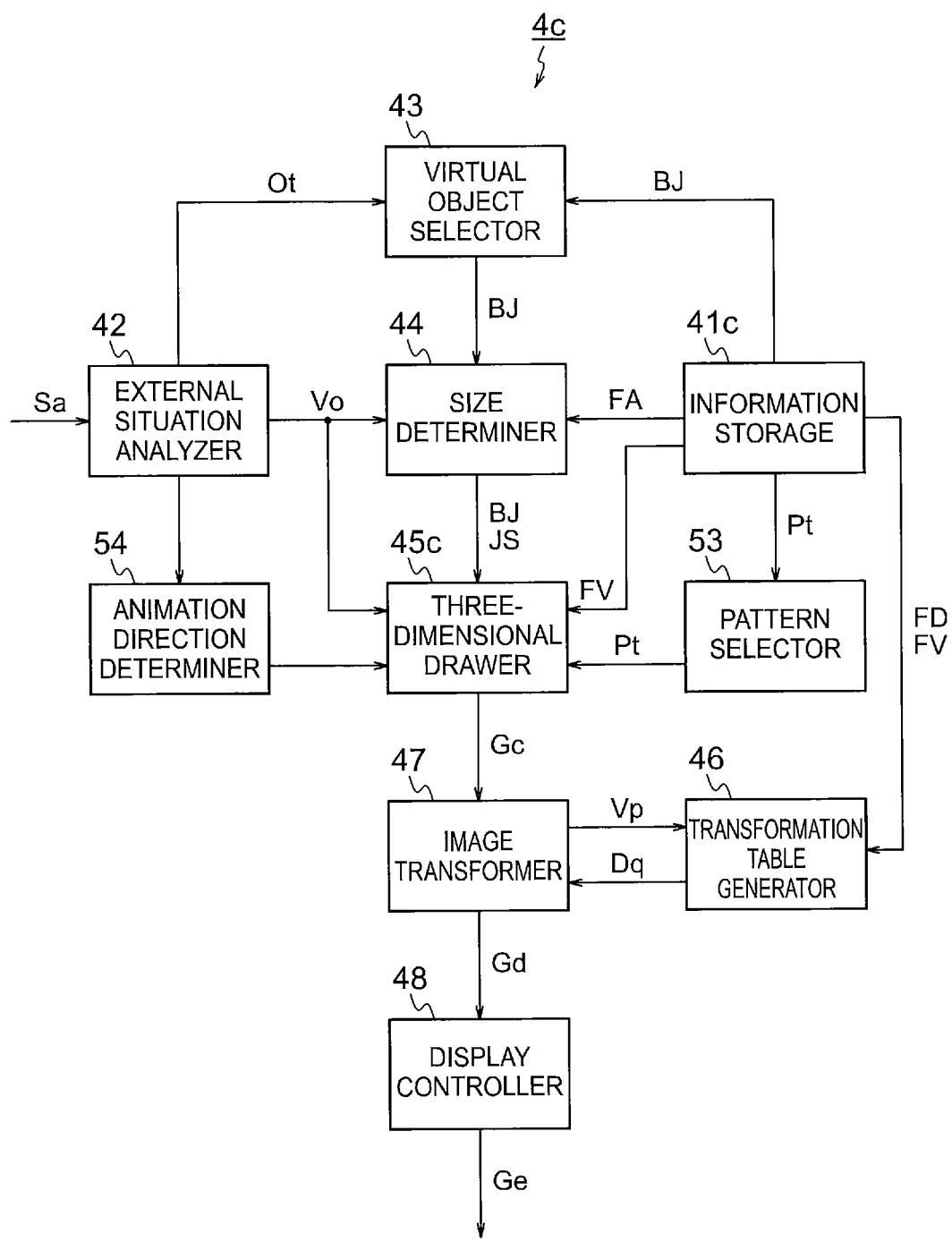
FIG. 17 is a functional block diagram illustrating an information display control device of a third embodiment of the present invention.

FIG. 17 illustrates an information display control device 4c of a third embodiment of the present invention.

The information display control device 4c of the third embodiment applies a variation pattern to the virtual object and moves the variation pattern so that the position of the object is more easily perceived from a direction of the pattern and a direction of the motion (animation).

Although the information display control device 4c illustrated in FIG. 17 is generally the same as the information display control device 4 of FIG. 5, it is different in that it additionally includes a pattern selector 53 and an animation direction determiner 54, and includes an information storage 41c and a three-dimensional drawer 45c instead of the information storage 41 and three-dimensional drawer 45.

The information storage 41c stores multiple variation patterns in addition to the same information as the information storage 41 of FIG. 5. Each of the variation patterns can be used in three-dimensional graphics. The variation patterns include density variation patterns, color variation patterns, and transmittance variation patterns.

These variation patterns are directional variation patterns. The directional variation patterns are, for example, patterns having a variation in density, color, transmittance, or the like only in one direction without having the same variation in directions perpendicular to the one direction. The one direction will be referred to below as the variation direction.

The variations of the variation patterns may be, for example, sinusoidal variations, rectangular wave variations, or variations along Gaussian distribution curves.

The pattern selector 53 selects one variation pattern Pt from among the multiple variation patterns stored in the information storage 41c.

The animation direction determiner 54 determines an animation direction Pd in accordance with the position Vo of the object.

The three-dimensional drawer 45c applies the variation pattern Pt selected by the pattern selector 53 to the virtual object selected by the virtual object selector 43.

The three-dimensional drawer 45c also moves the variation pattern Pt in the variation direction with time, thereby providing an animation effect.

The three-dimensional drawer 45c also orients the virtual object BJ so that the variation direction of the variation pattern Pt coincides with the animation direction Pd and places the virtual object BJ at the position Vo of the object.

The three-dimensional drawer 45c forms the image Gc of the virtual object on the virtual region VL by performing a perspective projection of the virtual object BJ provided with the variation pattern Pt, oriented, and positioned as described above, onto the virtual region VL, with the user viewpoint Ue as a reference.

The selection of the variation pattern Pt in the pattern selector 53, the determination of the animation direction Pd in the animation direction determiner 54, and the drawing in the three-dimensional drawer 45c will be described below in detail with reference to FIGS. 18 to 21B.

The selection of the variation pattern in the pattern selector 53 is performed, for example, on the basis of information regarding the detected object. The information regarding the object described here may be the type of the object, the position (e.g., the distance from a reference position Vr to be described later) of the object, the speed of motion of the object, or the acceleration of motion of the object. In these cases, it is possible to previously store detection results and variation patterns to be selected in accordance with the detection results in association with each other, and select the variation pattern corresponding to the detection result. The variation pattern corresponding to each detection result preferably suggests the detection result.

The following description describes a case where a sphere has been selected as the virtual object BJ and a transmittance variation pattern having a sinusoidal variation has been selected as the variation pattern Pt.

The determination of the animation direction Pd in the animation direction determiner 54 is performed on the basis of the object position Vo and reference position Vr.

The animation direction Pd is represented by a three-dimensional vector in the user viewpoint coordinate system.

Figure 18:
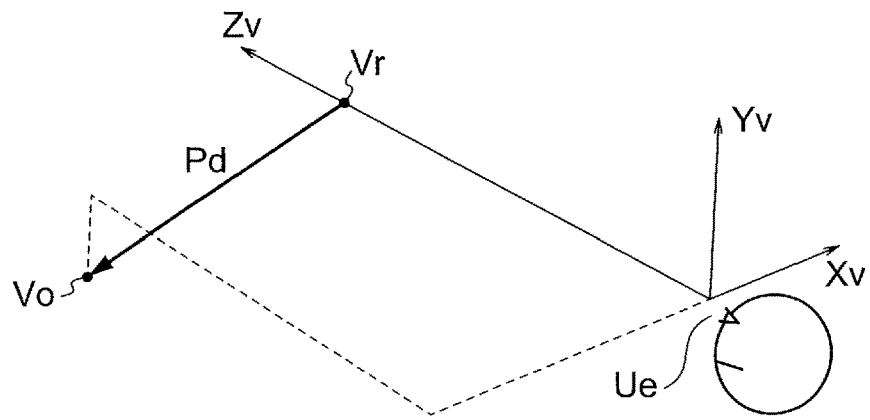
FIG. 18 is a diagram illustrating a relationship between the position of an object, a reference position, and an animation direction.

The vector is from the reference position Vr toward the object position Vo as illustrated in FIG. 18, and given by a difference (Vo−Vr) between Vo and Vr.

The reference position Vr can be set at an arbitrary point. To enhance the effect of allowing the position of the object to be intuitively perceived, it is preferably set in front of the user. For example, it may be set at a point on the line of sight of the user, e.g., the viewpoint position Ue.

In FIG. 18, the reference position Vr is set at a point on the line of sight of the user, i.e., on the Zv-axis, other than the viewpoint position Ue.

When a sphere has been selected as the virtual object BJ and a transmittance variation pattern having a sinusoidal variation has been selected as the variation pattern Pt, the three-dimensional drawer 45c varies the transmittances (a values) of respective portions of the sphere in accordance with the transmittance variation pattern. Specifically, a model coordinate system with a center of the sphere as an origin is defined, a straight line passing through the center is taken as a Zm-axis, and the transmittances of the respective portions are set to vary along the Zm-axis. When a polygon model is used as the sphere, the transmittances of the respective vertices are varied depending on their positions.

Figure 19A:
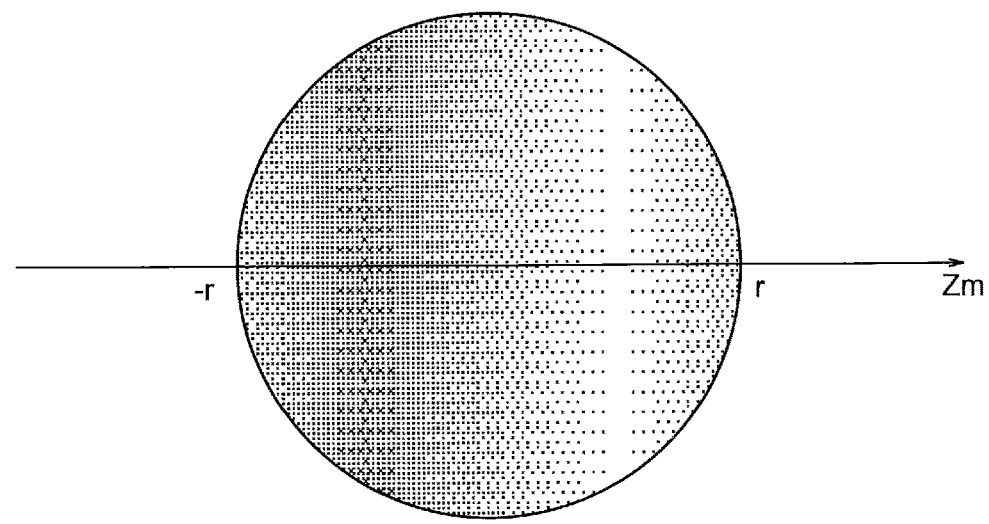
FIGS. 19A and 19B are diagrams illustrating a variation in transmittance of a variation pattern.
Figure 19B:
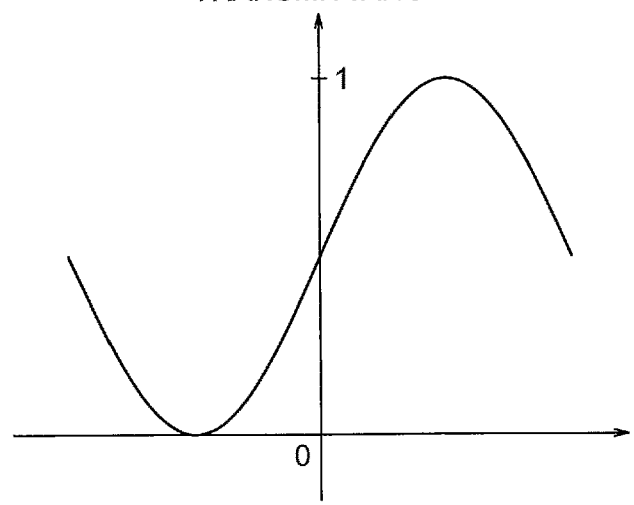

FIGS. 19A and 19B illustrate an example of the sinusoidal variation. In FIG. 19A, points made darker with black dots or the like indicate lower transmittances. The transmittances at respective positions in the Zm-axis direction have the values of the sinusoidal wave illustrated in FIG. 19B at the same positions (the positions in the Zm-axis direction). In the example of FIGS. 19A and 19B, the cycle of variation of the transmittance is equal to the diameter of the sphere forming the virtual object. However, the cycle of variation of the transmittance need not be equal to the diameter of the sphere forming the virtual object.

The three-dimensional drawer 45c shifts the position of the above transmittance variation pattern (spatial distribution of transmittance) in the Zm-axis direction with time. For example, it is moved in a direction of Zm-axis.

Figure 20A:
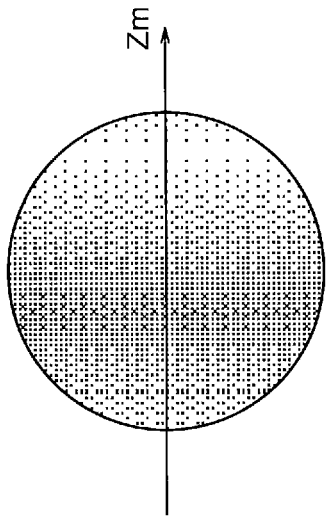
FIGS. 20A to 20D are diagrams illustrating the change in a spatial distribution of transmittance with time.
Figure 20B:
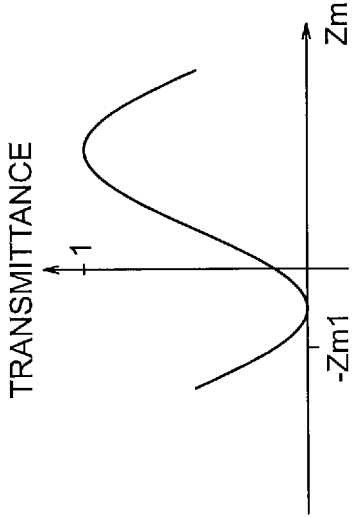
Figure 20C:
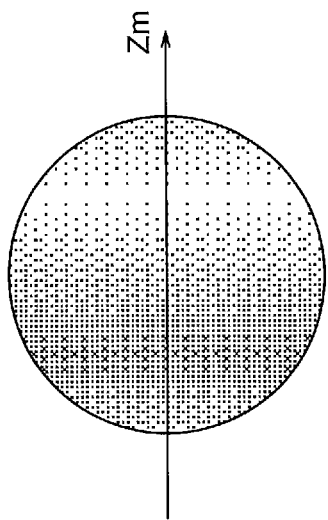
Figure 20D:
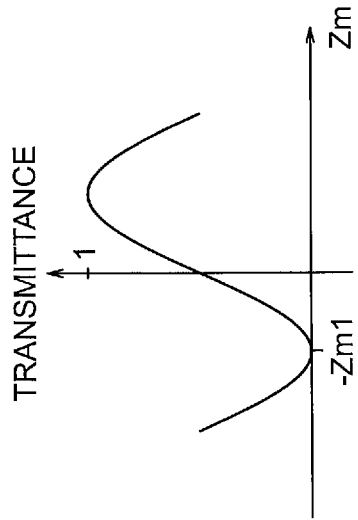

In this case, for example, at a certain time, as illustrated in FIGS. 20A and 20B, a portion where the transmittance is minimum is located near a center of a left half of the sphere (at the position where Zm=−Zm1), and at a time after a certain period of time has elapsed since then, as illustrated in FIGS. 20C and 20D, the portion where the transmittance is minimum is shifted to a position closer to the center of the sphere (the position where Zm=−Zm2).

The movement of the variation pattern is performed intermittently or continuously. Specifically, both the portion where the transmittance is minimum and a portion where the transmittance is maximum move from left to right. Since the sinusoidal wave is continuous, the above variation is repeated.

When the movement is performed intermittently, for example, it may be performed each time a predetermined period of time elapses or each time the three-dimensional drawing process is performed a predetermined number of times.

The speed of movement of the variation pattern may be constant or changed depending on various factors. For example, it may be set to a value according to the distance between the object and the reference position, the moving speed of the object, the moving acceleration, or the like.

The three-dimensional drawer 45c rotates the three-dimensional model to which the variation pattern moving with time is applied as described above so that the Zm-axis is parallel to the animation direction Pd. Since the animation direction Pd is represented by a three-dimensional directional vector, the rotation can be implemented by using Rodrigues' rotation formula.

The three-dimensional drawer 45c translates the three-dimensional model rotated as described above and makes the reference point thereof (the center of the sphere) coincide with the position Vo of the object.

Either the rotation or translation may be performed first.

Figure 21A:
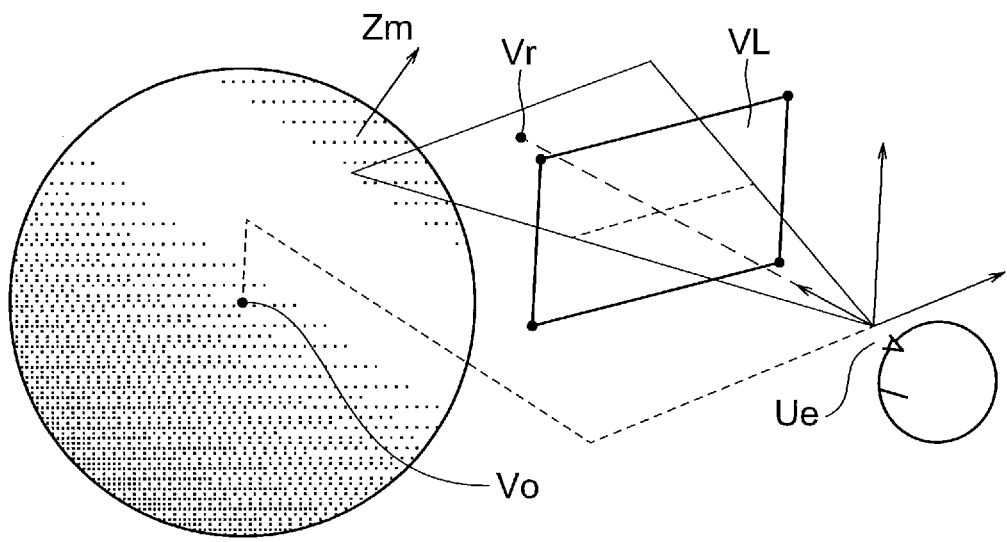
FIG. 21A is a diagram illustrating a virtual object oriented so that a variation direction of a variation pattern coincides with an animation direction.

With the process as described above, the transmittance of the virtual object BJ varies along the Zm-axis extending in the animation direction Pd, and the spatial distribution (variation pattern) of the transmittance moves in the Zm-axis direction with time. FIG. 21A illustrates the virtual object at a certain time.

The three-dimensional drawer 45c generates the image Gc of the virtual object on the virtual region VL by performing a perspective projection of the virtual object BJ provided with the variation pattern, positioned, and oriented as described above onto the virtual region VL, with the user viewpoint Ue as a reference.

Figure 21B:
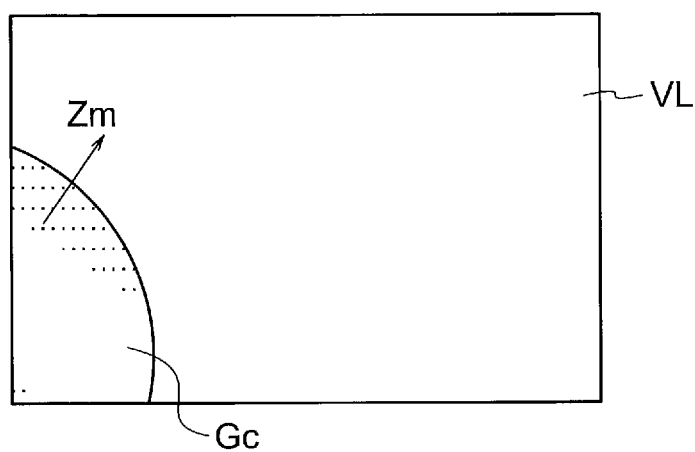
FIG. 21B is a diagram illustrating an image of the virtual object formed by projecting the virtual object in FIG. 21A onto a virtual region.

FIG. 21B illustrates the image of the virtual object formed by projecting the virtual object in FIG. 21A. As described with reference to FIGS. 20A to 20D, the variation pattern of the virtual object moves in the Zm-axis direction with time. Similarly to the virtual object, the variation pattern in the image Gc also moves in the Zm-axis direction with time.

When an image of part of the virtual object is displayed in the display region of the display by performing the process as described above, the user can perceive the part of the virtual object that is not being displayed, by amodal completion, and intuitively perceive the position of the center of the virtual object (the center of the sphere). Moreover, by applying the directional variation pattern indicating the position of the object to the virtual object and moving the variation pattern, it becomes easier for the user to intuitively perceive the position Vo of the object.

Although the above example uses a pattern having a sinusoidal variation in transmittance along the Zm-axis, it is possible to use a pattern having a variation along another waveform or another curve. For example, it is possible to use a pattern having a rectangular wave variation or a pattern having a variation along a Gaussian distribution curve.

In the above example, the variation pattern is selected on the basis of information regarding the object detected by the external situation analyzer 42. Alternatively, the variation pattern may be selected regardless of information regarding the object. For example, it is possible to allow the variation pattern to be selected depending on the preference of the user. In this case, it is possible that a variation pattern is selected upon start of the driving assistance system, and the same variation pattern continues to be used.

The information storage 41c may store only one variation pattern. In this case, the pattern selector 53 is unnecessary, the external situation analyzer 42 need not obtain information regarding the object for selecting the variation pattern, and the three-dimensional drawer 45c performs the drawing of the virtual object by using the only one variation pattern stored in the information storage 41.

Although in the first to third embodiments, the detection signal processor 24 is described to be part of the external situation detector 2, it may be part of the information display control device 4, 4b, or 4c.

Also, although in the second embodiment, the detection signal processor 32 is described to be part of the internal situation detector 3, it may be part of the information display control device 4b.

Each of the information display control devices 4, 4b, and 4c is formed by one or more processing circuits.

Each processing circuit may be formed by dedicated hardware or may be formed by a processor and a program memory.

When being formed by dedicated hardware, each processing circuit may be, for example, an application specific integrated circuit (ASIC), a field-programmable gate array (FPGA), or a combination of them.

When being formed by a processor and a program memory, each processing circuit may be implemented by software, firmware, or a combination of software and firmware. The software or firmware is described as a program, and stored in the program memory. The processor implements the function of the processing circuit by reading and executing the program stored in the program memory.

Here, the processor may be, for example, what is called a central processing unit (CPU), an arithmetic device, a microprocessor, a microcomputer, or a digital signal processor (DSP).

The program memory may be, for example, a non-volatile or volatile semiconductor memory, such as a random access memory (RAM), a read only memory (ROM), a flash memory, an erasable programmable ROM (EPROM), or an electrically EPROM (EEPROM), a magnetic disc, such as a hard disc, or an optical disc, such as a compact disc (CD) or a digital versatile disc (DVD).

It is possible that a part of the functions of the information display control devices 4, 4b, and 4c is implemented by dedicated hardware, and another part is implemented by software or firmware. Thus, the information display control device 4, 4b, and 4c may implement the above functions by using hardware, software, firmware, or a combination of them.

FIG. 22 illustrates a computer including one processor that implements the functions of the information display control device 4, 4b, and 4c.

The illustrated computer includes a processor 101, an external storage medium 102, a memory 103, a network interface 104, and a display interface 105.

The external storage medium 102 stores a program that is executed by the processor 101. The program stored in the external storage medium 102 is read by the processor 101 into the memory 103 and executed by the processor 101.

A part of the function of the information storage 41, 41b, and 41c is served by the external storage medium 102, and the remainder is served by the memory 103.

Further, the function of storing the transformation table CT by the transformation table generator 46 or 46b is served by the memory 103.

Hereinafter, a procedure of a process when the process in the information display control device 4 of the first embodiment is implemented by the processor 101 illustrated in FIG. 22 will be described with reference to FIG. 23.

In this case, the external situation detector 2 is connected to the network interface 104, and the display 6 is connected to the display interface 105.

It is assumed that the display region information FD, the virtual region information FV, information indicating the viewpoint position Ue, and information indicating the line-of-sight direction Ud are previously stored in the external storage medium 102.

In step ST11, the processor 101 acquires the detection information Sa from the external situation detector 2 via the network interface 104. The processor 101 detects an object located around the vehicle on the basis of the acquired detection information Sa, and determines the type Ot of the detected object. The processor 101 stores the determination result in the memory 103. This process corresponds to the process performed by the external situation analyzer 42 of FIG. 5.

In step ST12, the processor 101 selects one virtual object BJ from among multiple virtual objects stored in the external storage medium 102, and stores information indicating the selected virtual object BJ in the memory 103. This process corresponds to the process performed by the virtual object selector 43 of FIG. 5.

In step ST13, the processor 101 generates the transformation table CT from the display region information FD and virtual region information FV stored in the external storage medium 102, and stores the generated transformation table CT in the memory 103. This process corresponds to the process performed by the transformation table generator 46 of FIG. 5.

In step ST14, the processor 101 obtains information indicating the position Vo of the object detected in step ST11, and stores it in the memory 103. This process corresponds to the process performed by the external situation analyzer 42 of FIG. 5.

In step ST15, the processor 101 determines the size JS of the virtual object on the basis of the specified region information FA stored in the external storage medium 102, and the information indicating the virtual object BJ and the information indicating the position Vo of the object stored in the memory 103, and stores the determined size JS in the memory 103. This process corresponds to the process performed by the size determiner 44 of FIG. 5.

In step ST16, the processor 101 generates the image Gc of the virtual object on the basis of the virtual region information FV stored in the external storage medium 102, and the information indicating the virtual object BJ, the information indicating the size JS of the virtual object, and the information indicating the position Vo of the object stored in the memory 103, and stores the generated image Gc in the memory 103. This process corresponds to the process performed by the three-dimensional drawer 45 of FIG. 5.

In step ST17, the processor 101 transforms the image Gc on the memory 103 by using the transformation table CT, and stores the transformed image Gd in the memory 103. This process corresponds to the process performed by the image transformer 47 of FIG. 5.

In step ST18, the processor 101 acquires the transformed image Gd on the memory 103, transmits a part of the transformed image Gd within the display region DL, as the display image Ge, to the display 6 via the display interface 105, and causes the display 6 to display it. This process corresponds to the process performed by the display controller 48 of FIG. 5.

The processes of steps ST14 to ST18 are repeatedly performed.

Next, a procedure of a process when the process in the information display control device 4b of the second embodiment is implemented by the processor 101 illustrated in FIG. 22 will be described with reference to FIG. 24.

In this case, not only the external situation detector 2 but also the internal situation detector 3 are connected to the network interface 104.

Figure 24:
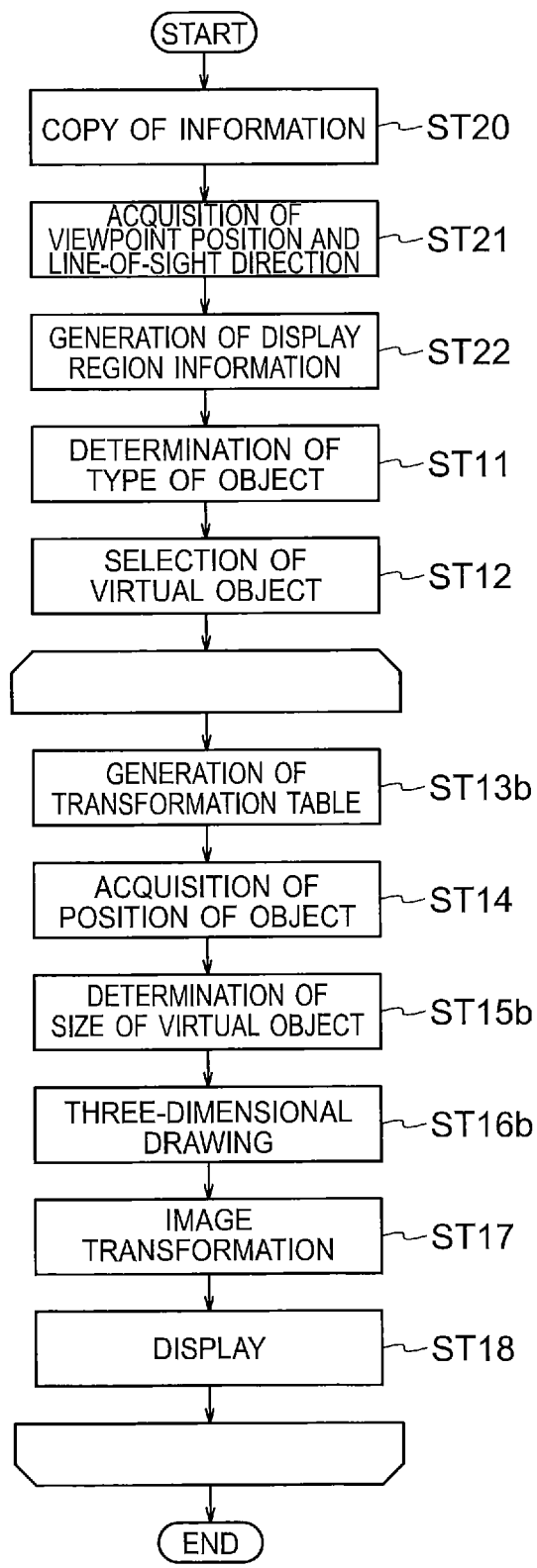
FIG. 24 is a flowchart illustrating a procedure of a process in a case of causing the processor to execute a process of the information display control device of the second embodiment.

In FIG. 24, the same reference characters as in FIG. 23 denote the same processes.

Although FIG. 24 is generally the same as FIG. 23, it additionally includes steps ST20, ST21, and ST22, and includes steps ST13b, ST15b, and ST16b instead of steps ST13, ST15, and ST16.

In step ST20, the processor 101 copies, in the memory 103, the display region information FD, the virtual region information FV, the information indicating the viewpoint position Ue, and the line-of-sight direction Ud stored in the external storage medium 102.

In step ST21, the processor 101 acquires the detection information Sb from the internal situation detector 3 via the network interface 104, detects the viewpoint position Ue and line-of-sight direction Ud of the user on the basis of the acquired detection information Sb, and stores information obtained by the detection in the memory 103. When information indicating the viewpoint position Ue and information indicating the line-of-sight direction Ud are already stored, overwriting is performed. This process corresponds to the process performed by the internal situation analyzer 51 of FIG. 16.

In step ST22, the processor 101 calculates the coordinates Vdlt, Vdrt, Vdlb, and Vdrb in the user viewpoint coordinate system of the display region information FD, on the basis of the viewpoint position Ue and line-of-sight direction Ud of the user stored in the memory 103. Then, it writes the display region information FD including the calculated coordinates in the memory 103. When the display region information FD is already written, overwriting is performed. This process corresponds to the process performed by the display region information generator 52 of FIG. 16.

In step ST13b, the processor 101 generates the transformation table CT by using the display region information FD and virtual region information FV stored in the memory 103. The processor 101 writes the generated transformation table CT in the memory 103. When the transformation table CT is already written, overwriting is performed. This process corresponds to the process performed by the transformation table generator 46 of FIG. 16.

In step ST15b, the processor 101 determines the size JS of the virtual object on the basis of the specified region information FA, the information indicating the virtual object BJ, and the information indicating the position Vo of the object stored in the memory 103, and stores the determined size JS in the memory 103. This process corresponds to the process performed by the size determiner 44 of FIG. 16.

In step ST16b, the processor 101 generates the image Gc of the virtual object on the basis of the virtual region information FV, the information indicating the virtual object BJ, the information indicating the size JS of the virtual object, and the information indicating the position Vo of the object stored in the memory 103, and stores the generated image Gc in the memory 103. This process corresponds to the process performed by the three-dimensional drawer 45 of FIG. 16.

Next, a procedure of a process when the process in the information display control device 4c of the third embodiment is implemented by the processor 101 illustrated in FIG. 22 will be described with reference to FIG. 25.

Figure 25:
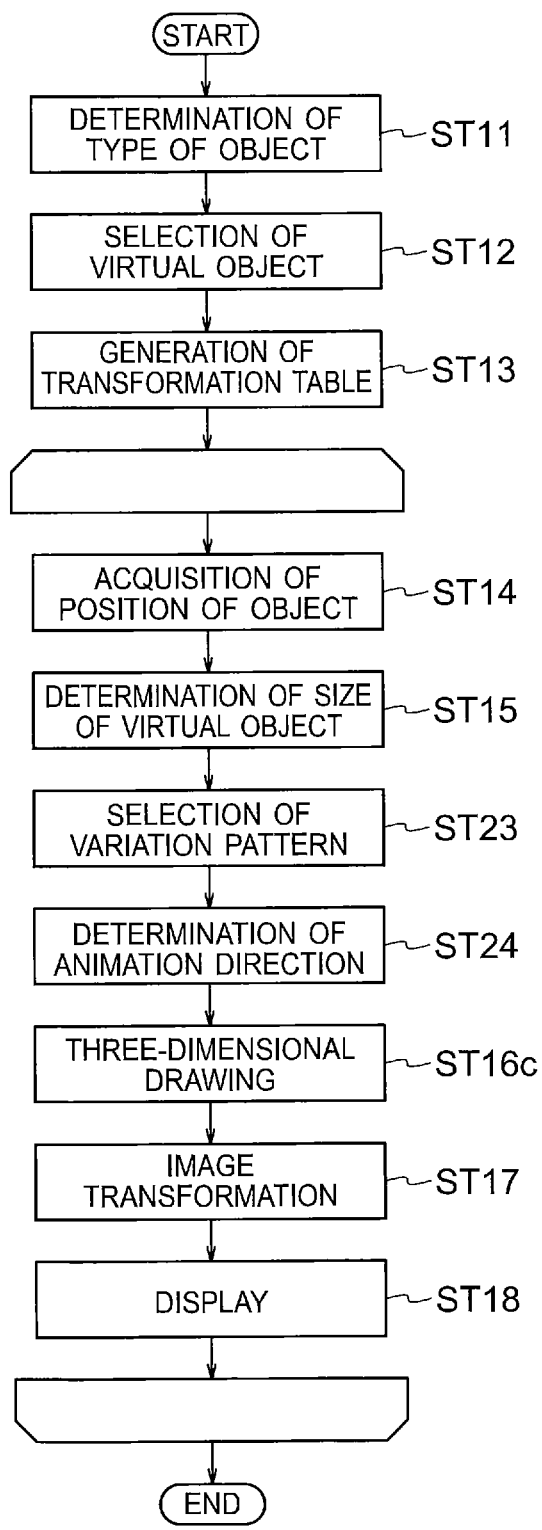
FIG. 25 is a flowchart illustrating a procedure of a process in a case of causing the processor to execute a process of the information display control device of the third embodiment.

In FIG. 25, the same reference characters as in FIG. 23 denote the same processes.

Although FIG. 25 is generally the same as FIG. 23, it additionally includes steps ST23 and ST24, and includes step ST16c instead of step ST16.

In step ST23, the processor 101 selects one variation pattern Pt from among multiple variation patterns stored in the external storage medium 102, and stores the selected variation pattern Pt in the memory 103. This process corresponds to the process performed by the pattern selector 53 of FIG. 17.

In step ST24, the processor 101 determines the animation direction Pd on the basis of the position Vo of the object on the memory 103, and stores the determined animation direction Pd in the memory 103. This process corresponds to the process performed by the animation direction determiner 54 of FIG. 17.

In step ST16c, the processor 101 applies the variation pattern Pt on the memory 103 to the virtual object on the memory 103, moves the variation pattern Pt in the animation direction Pd with time, orients the virtual object BJ so that the variation direction of the variation pattern Pt coincides with the animation direction Pd, and places the virtual object BJ at the position Vo of the object. The processor 101 further forms the image Gc of the virtual object on the virtual region VL by performing a perspective projection of the virtual object BJ provided with the variation pattern Pt, oriented, and positioned as described above onto the virtual region VL, with the user viewpoint Ue as a reference. This process corresponds to the process performed by the three-dimensional drawer 45c of FIG. 17.

Although the information display control devices according to the present invention have been described above, the information display control methods implemented by the information display control devices are also part of the present invention. In addition, programs for causing computers to execute processes of these devices or methods and computer-readable recording media storing such programs are also part of the present invention.

DESCRIPTION OF REFERENCE CHARACTERS 1, 1b driving assistance device, 2 external situation detector, 3 internal situation detector, 4, 4b information display control device, 6 display, 21 imager, 22 detector, 23 communicator, 24 detection signal processor, 31 imager, 32 detection signal processor, 41, 41b, 41c information storage, 42 external situation analyzer, 43 virtual object selector, 44 size determiner, 45, 45c three-dimensional drawer, 46 transformation table generator, 47 image transformer, 48 display controller, 51 internal situation analyzer, 52 display region information generator, 53 pattern selector, 54 animation direction determiner.

What is claimed is:

1. An information display control device to display, in a display region, an image of a virtual object for indicating a position of an object, the information display control device comprising:
    a size determiner to determine a size of the virtual object on a basis of the position of the object;
    a three-dimensional drawer to generate an image of the virtual object by placing the virtual object whose size has been determined, at the position of the object, and performing a perspective projection of the virtual object onto a virtual region with a viewpoint of a user as a reference;
    a transformation table generator to generate a transformation table representing a relationship between a plurality of grid points in the virtual region and points corresponding to the plurality of grid points in a plane including the display region;
    an image transformer to generate a display image of the virtual object by transforming the image of the virtual object by using the transformation table; and
    a display controller to display the display image in the display region,
    wherein the virtual object is a three-dimensional figure such that a whole of the three-dimensional figure can be perceived from part of the three-dimensional figure by amodal completion.

2. The information display control device of claim 1, wherein the virtual object is one of a sphere and a cone.

3. The information display control device of claim 1, wherein the size determiner determines the size of the virtual object further on a basis of a size of a specified region of the virtual region specified for formation of the image of the virtual object.

4. The information display control device of claim 1, wherein the size determiner determines the size of the virtual object further on a basis of a reference view angle.

5. The information display control device of claim 4, wherein the reference view angle is a reference horizontal view angle or a reference vertical view angle.

6. The information display control device of claim 1, further comprising:
    an information storage to store a plurality of virtual objects; and
    a virtual object selector to select one of the plurality of virtual objects stored in the information storage,
    wherein the size determiner determines a size of the virtual object selected by the virtual object selector, and
    wherein the three-dimensional drawer generates an image of the virtual object selected by the virtual object selector.

7. The information display control device of claim 6, wherein the virtual object selector selects the virtual object on a basis of information regarding the object.

8. The information display control device of claim 7, wherein the information regarding the object is a type of the object, a size of the object, or the position of the object.

9. The information display control device of claim 1, wherein the point corresponding to each of the plurality of grid points is an intersection of a straight line passing through the grid point and the viewpoint of the user with the plane including the display region.

10. The information display control device of claim 1, further comprising an animation direction determiner to determine an animation direction from the position of the object,
    wherein the three-dimensional drawer generates the image of the virtual object by applying a variation pattern having a variation direction to the virtual object, moving the variation pattern in the variation direction with time, orienting the virtual object so that the variation direction of the variation pattern coincides with the animation direction, and projecting the virtual object thus oriented onto the virtual region.

11. The information display control device of claim 10, wherein the variation pattern is a density variation pattern, a color variation pattern, or a transmittance variation pattern.

12. The information display control device of claim 10, wherein the animation direction is a direction indicated by a vector connecting the position of the object and an arbitrary reference position.

13. An information display control method to display, in a display region, an image of a virtual object for indicating a position of an object, the information display control method comprising:
    determining a size of the virtual object on a basis of the position of the object;
    generating an image of the virtual object by placing the virtual object whose size has been determined, at the position of the object, and performing a perspective projection of the virtual object onto a virtual region with a viewpoint of a user as a reference;
    generating a display image of the virtual object by transforming the image of the virtual object by using a transformation table representing a relationship between a plurality of grid points in the virtual region and points corresponding to the plurality of grid points in a plane including the display region; and
    displaying the display image in the display region,
    wherein the virtual object is a three-dimensional figure such that a whole of the three-dimensional figure can be perceived from part of the three-dimensional figure by amodal completion.

14. A non-transitory computer-readable recording medium storing a program for causing a computer to execute a process of the information display control method of claim 13.

* * * * *